United States Patent
Go et al.

(10) Patent No.: US 12,101,274 B2
(45) Date of Patent: Sep. 24, 2024

(54) METHOD FOR TRANSMITTING AND RECEIVING SOUNDING REFERENCE SIGNAL IN WIRELESS COMMUNICATION SYSTEM AND DEVICE THEREFOR

(71) Applicant: LG ELECTRONICS INC., Seoul (KR)

(72) Inventors: Seongwon Go, Seoul (KR); Jonghyun Park, Seoul (KR); Jiwon Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 423 days.

(21) Appl. No.: 17/599,178

(22) PCT Filed: Mar. 30, 2020

(86) PCT No.: PCT/KR2020/004348
§ 371 (c)(1),
(2) Date: Sep. 28, 2021

(87) PCT Pub. No.: WO2020/197357
PCT Pub. Date: Oct. 1, 2020

(65) Prior Publication Data
US 2022/0166587 A1    May 26, 2022

Related U.S. Application Data

(60) Provisional application No. 62/825,751, filed on Mar. 28, 2019.

(51) Int. Cl.
*H04W 72/04*    (2023.01)
*H04L 5/00*    (2006.01)

(52) U.S. Cl.
CPC .................. *H04L 5/0053* (2013.01)

(58) Field of Classification Search
CPC ... H04L 5/0053; H04L 5/0094; H04L 5/0048; H04L 5/0023; H04L 1/1864; H04B 7/0602; H04B 7/0691
See application file for complete search history.

(56) References Cited

U.S. PATENT DOCUMENTS

2018/0227094 A1*  8/2018  Liu .................. H04B 7/06966
2019/0349066 A1*  11/2019 Yang ................. H04B 7/0697
2020/0137592 A1*  4/2020  Guo .................. H04B 7/0404
(Continued)

FOREIGN PATENT DOCUMENTS

WO    WO2018231141    12/2018

OTHER PUBLICATIONS

Fraunhofer IIS, Fraunhofer HHI, "Enhancements on UE multi-beam operation," R1-1902122, Presented at 3GPP TSG RAN WG1 Meeting #96, Athens, Greece Feb. 25-Mar. 1, 2019, 8 pages.
(Continued)

*Primary Examiner* — Mahbubul Bar Chowdhury
(74) *Attorney, Agent, or Firm* — Fish & Richardson P.C.

(57) ABSTRACT

A method for transmitting a sounding reference signal (SRS) by a terminal in a wireless communication system according to an embodiment of the present specification, comprises the steps of: transmitting UE capability information associated with transmission of a sounding reference signal (SRS) based on a specific usage; receiving configuration information associated with the transmission of the SRS; and transmitting the SRS.

12 Claims, 22 Drawing Sheets

(56) References Cited

U.S. PATENT DOCUMENTS

| | | | | |
|---|---|---|---|---|
| 2020/0204316 A1* | 6/2020 | Zhang | .................. | H04L 5/0007 |
| 2020/0287680 A1* | 9/2020 | Zhou | .................... | H04W 76/10 |
| 2020/0336264 A1* | 10/2020 | Faxér | .................. | H04B 7/0617 |
| 2021/0167821 A1* | 6/2021 | Chen | .................... | H04B 7/0404 |
| 2021/0258811 A1* | 8/2021 | Zhang | ................. | H04B 7/0691 |
| 2021/0281448 A1* | 9/2021 | Li | ......................... | H04L 5/0051 |
| 2021/0360649 A1* | 11/2021 | Athley | ................ | H04W 72/542 |
| 2022/0021420 A1* | 1/2022 | Liu | ...................... | H04B 7/0413 |
| 2022/0094415 A1* | 3/2022 | Hakola | ................ | H04B 7/0691 |
| 2022/0123799 A1* | 4/2022 | Varatharaajan | ....... | H04L 5/0048 |

OTHER PUBLICATIONS

International Search Report in International Appln. No. PCT/KR2020/004348, dated Jul. 28, 2020, 5 pages (with English translation).

LG Electronics, "Discussion on multi-beam based operations and enhancements," R1-1902092, Presented at 3GPP TSG RAN WG1 Meeting #96, Athens, Greece, Feb. 25-Mar. 1, 2019, 12 pages.

Nokia, Nokia Shanghai Bell, "Enhancements on Multi-beam Operation," R1-1902564, Presented at 3GPP TSG RAN WG1 Meeting #96, Athens, Greece, Feb. 25-Mar. 1, 2019, 20 pages.

Ye, "Reply LS on SRS switching," R4-1805660, Presented at 3GPP TSG RAN WG1 Meeting #93, Busan, Korea, May 21-25, 2018 & R4-1805660, 3GPP TSG-RAN WG4 Meeting #86bis, Melbourne, Australia, Apr. 16-20, 2018, 2 pages.

* cited by examiner

[FIG. 1]
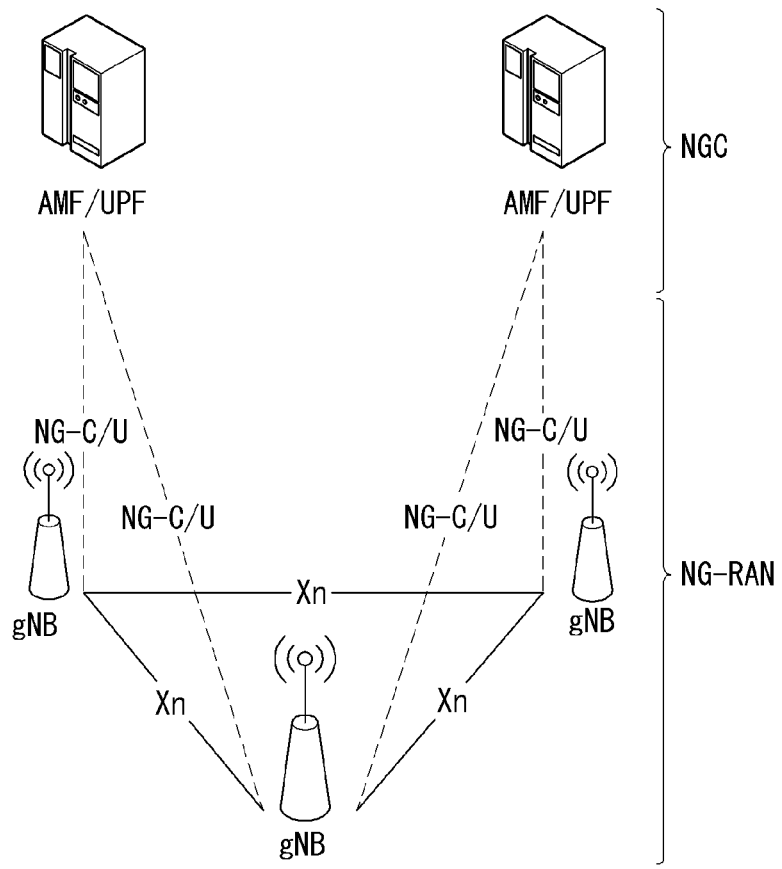
[FIG. 2]
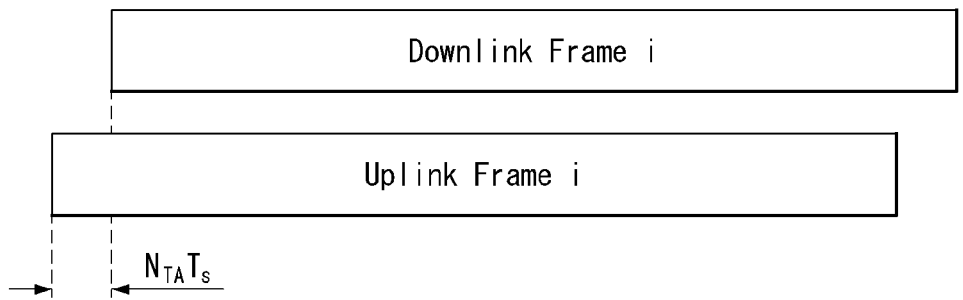

[FIG. 3]
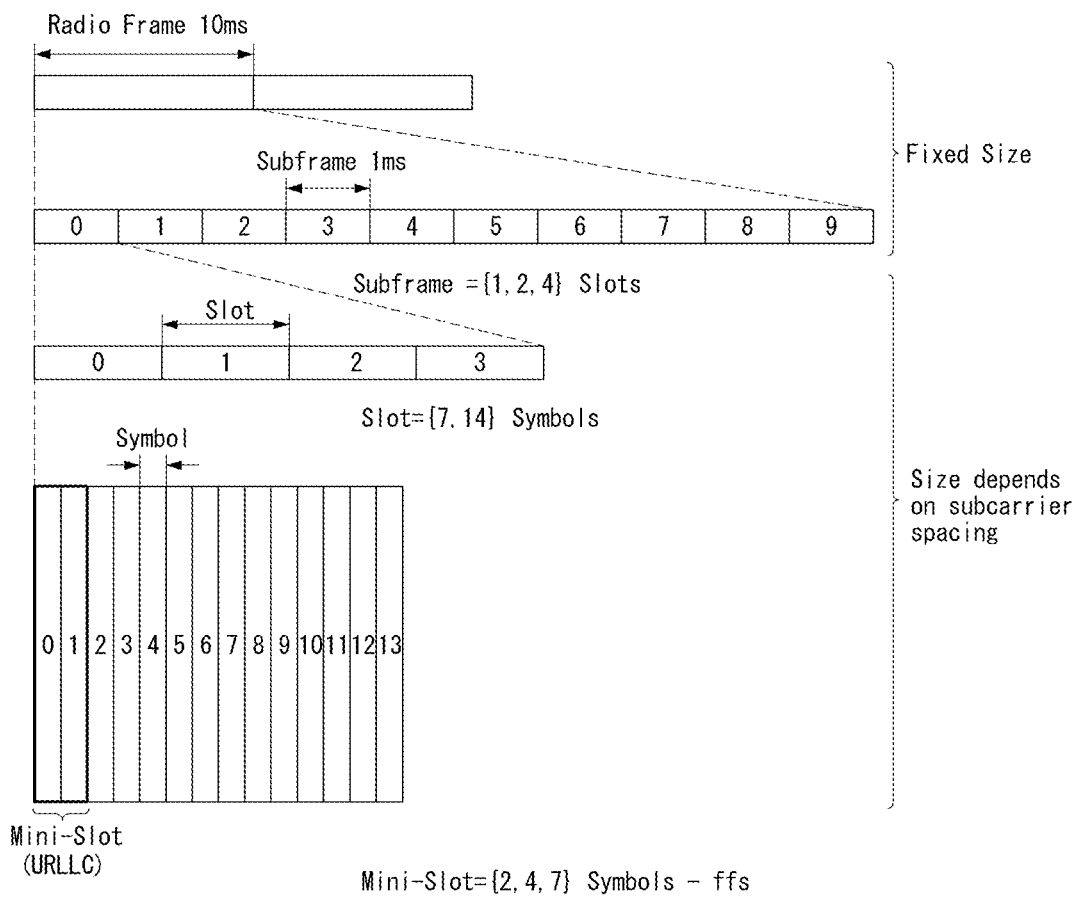

[FIG. 4]
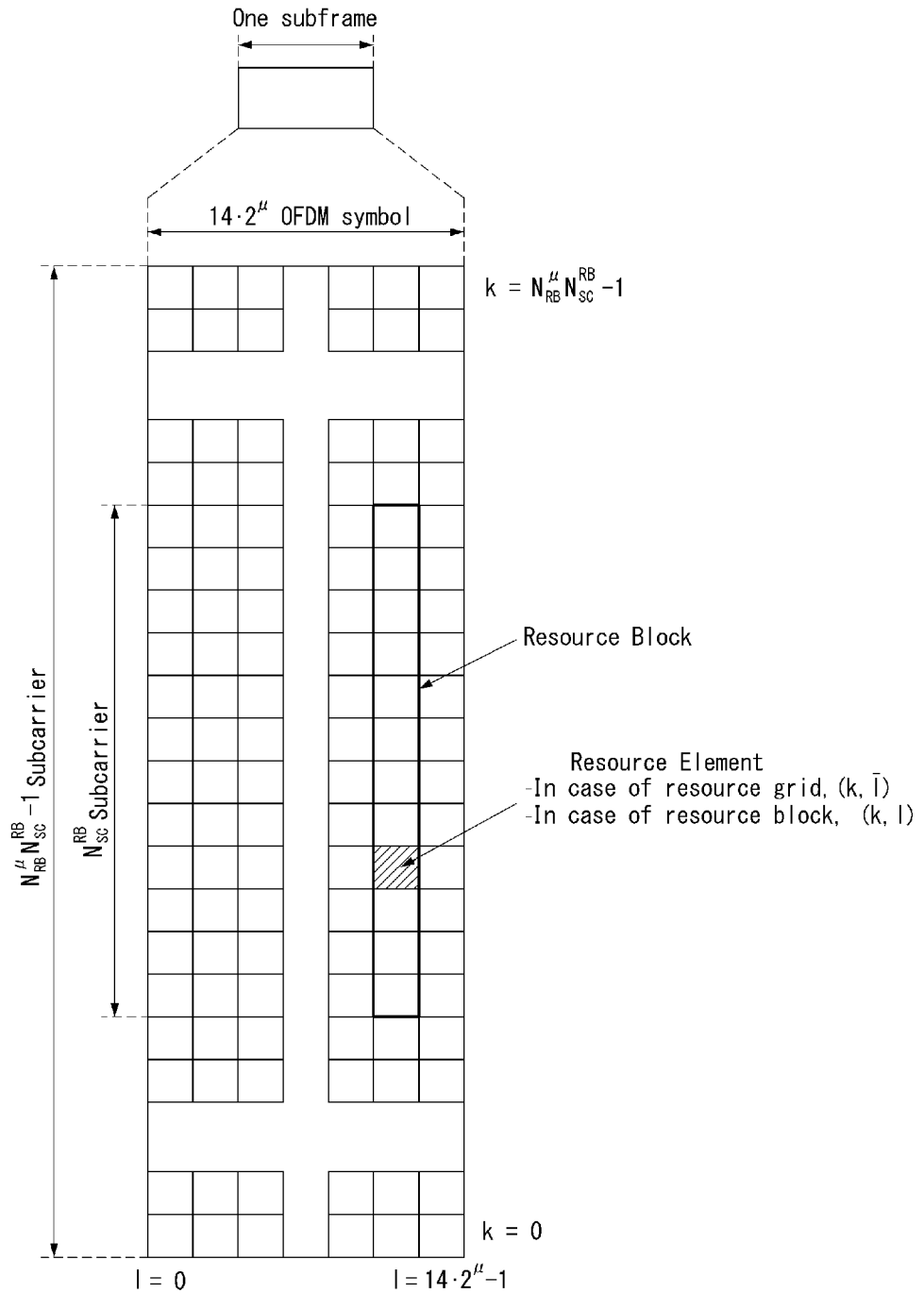

[FIG. 5]
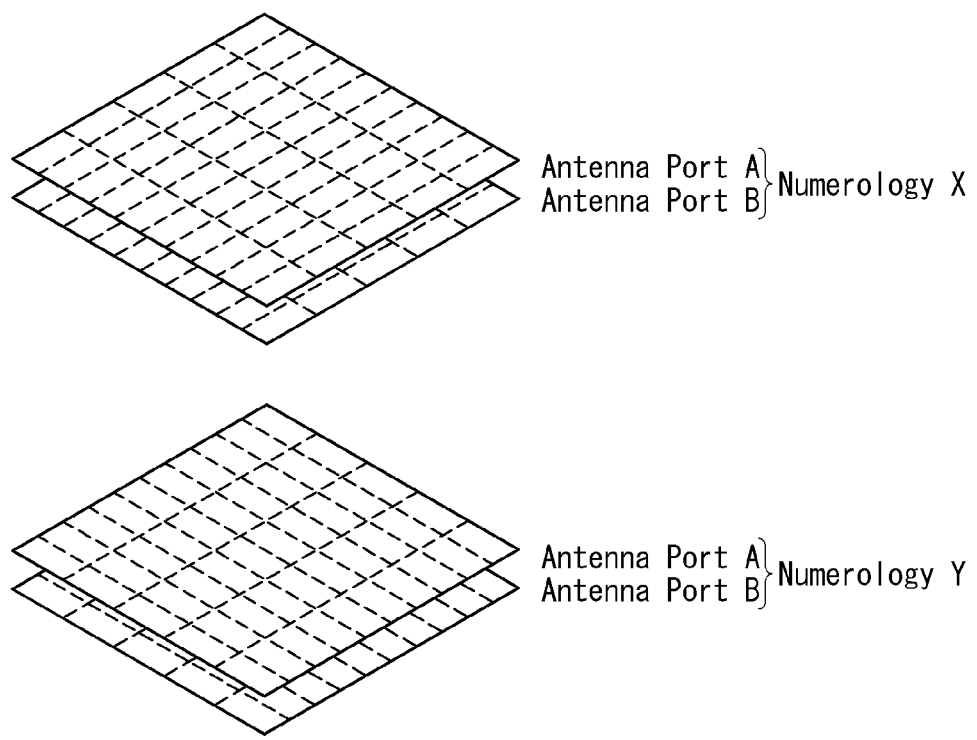

[FIG. 6]
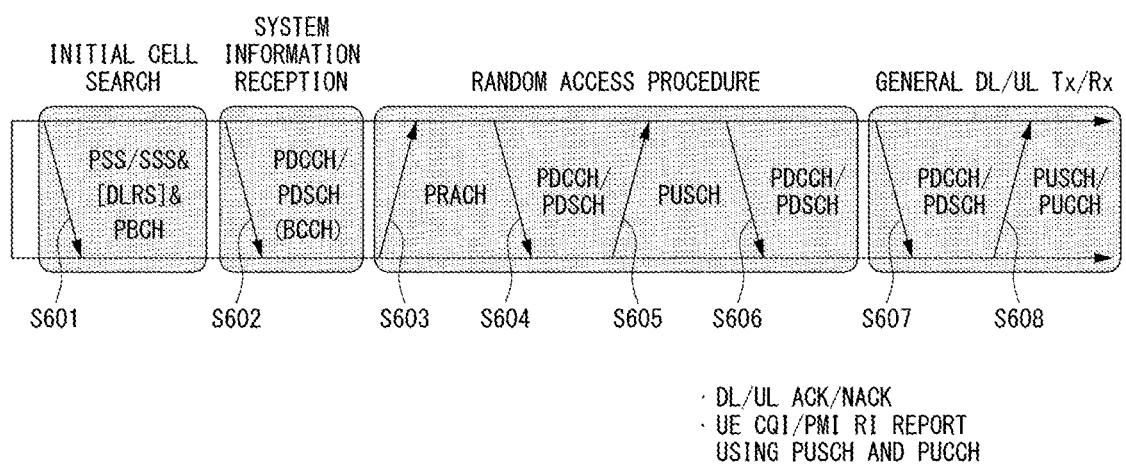

[FIG. 7]
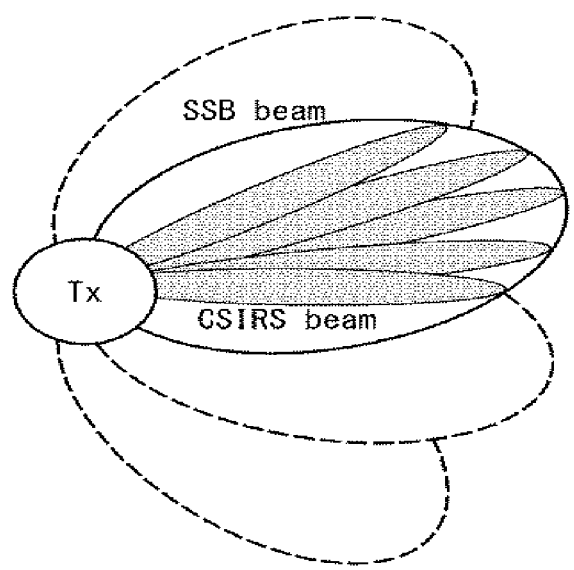

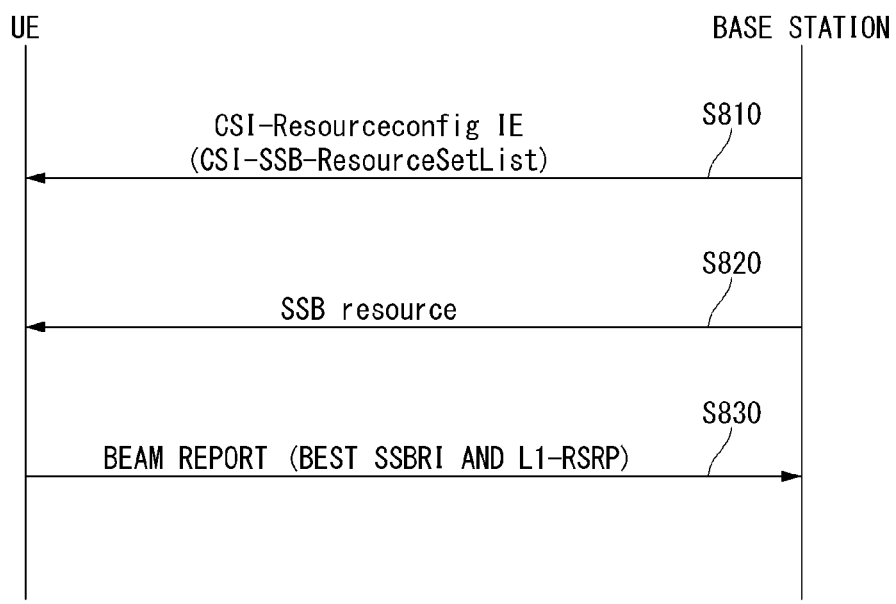
[FIG. 8]

[FIG. 9]
(a) 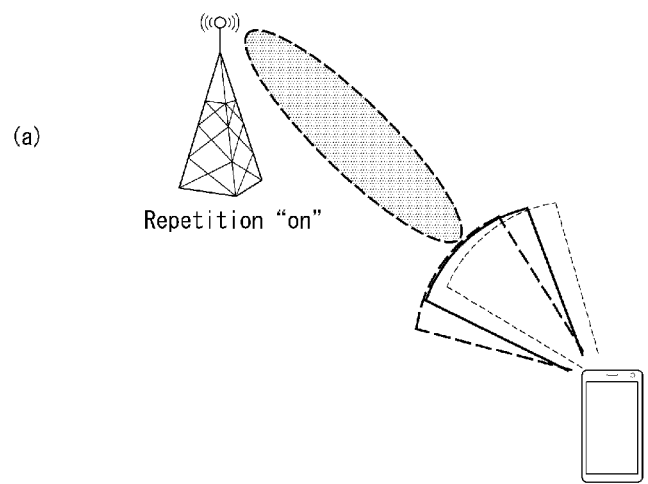
Repetition "on"
(b) 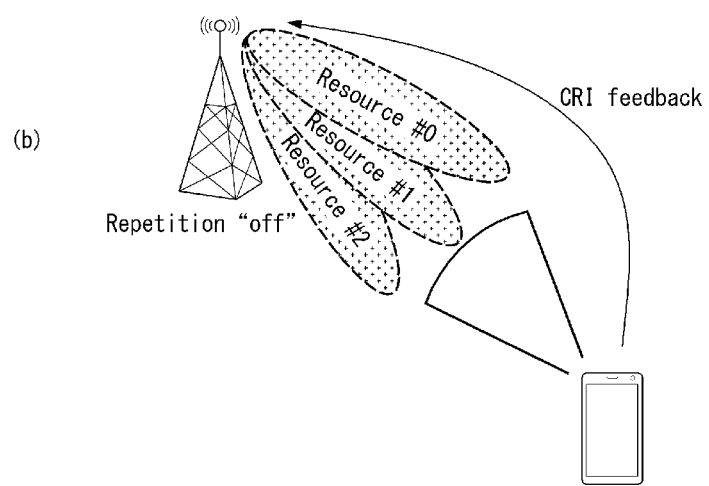
Repetition "off"
CRI feedback

[FIG. 10]
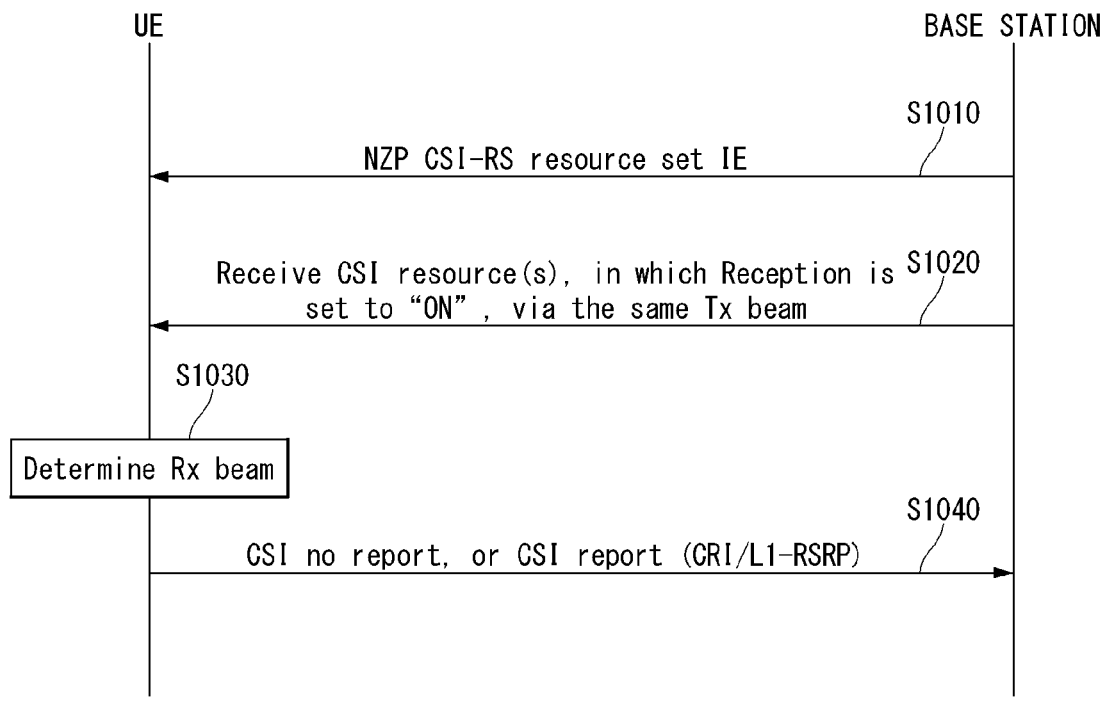

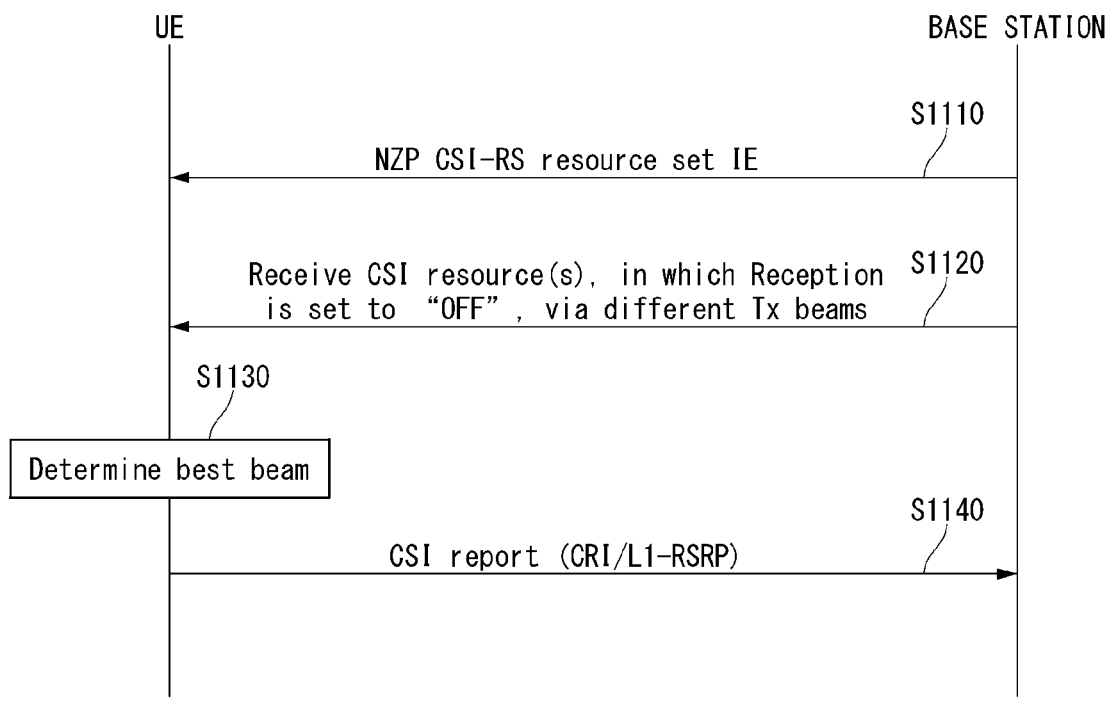

[FIG. 12]
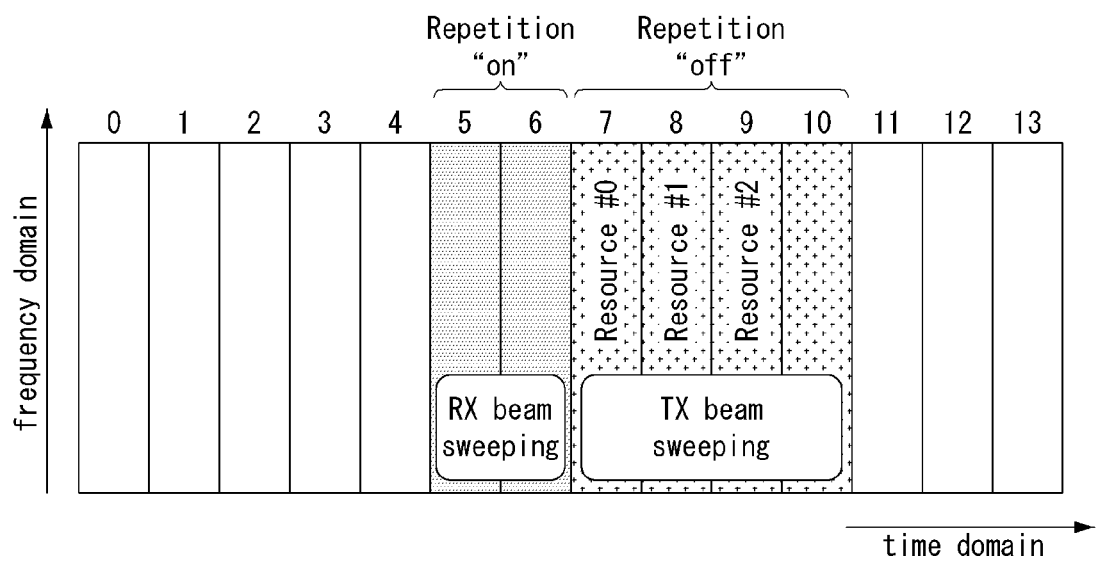

[FIG. 13]
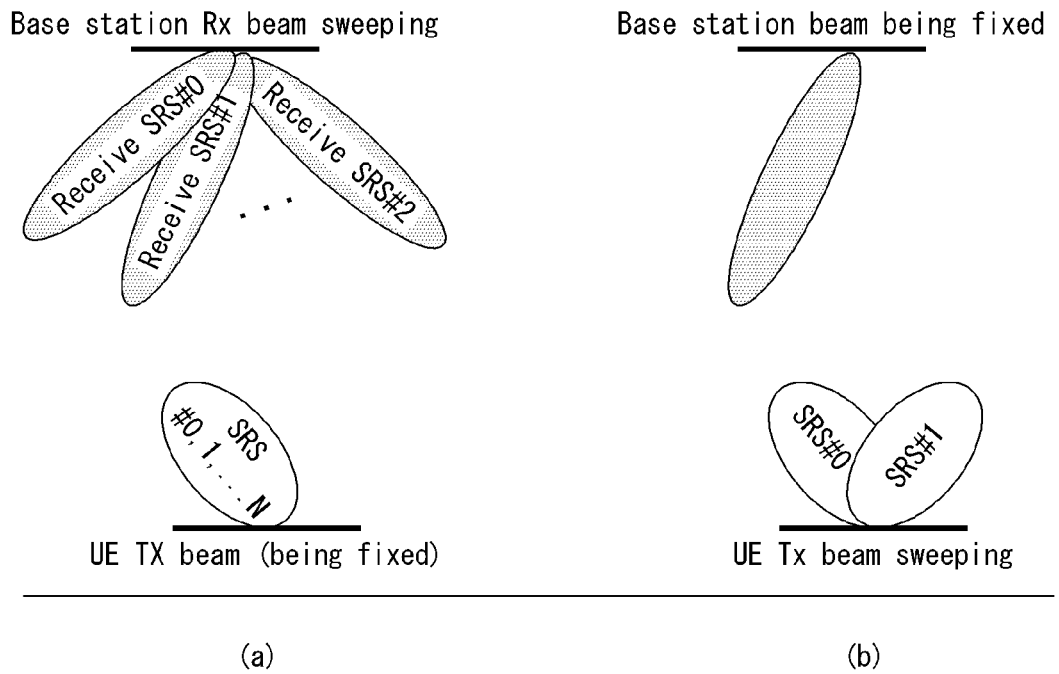
(a)　　　　　　　　　　　　(b)

[FIG. 14]
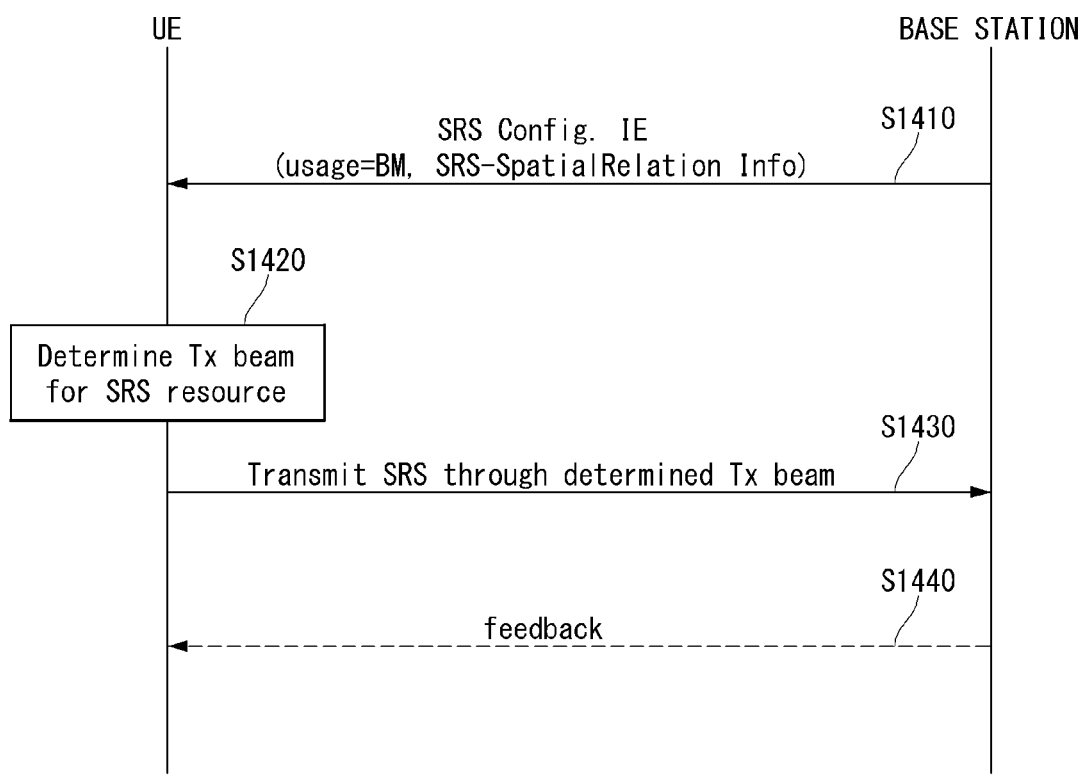

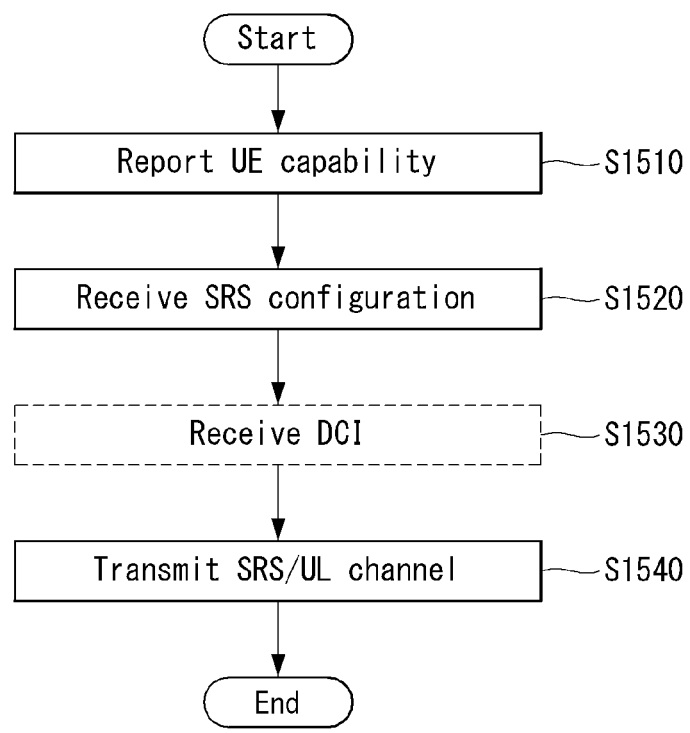
[FIG. 15]

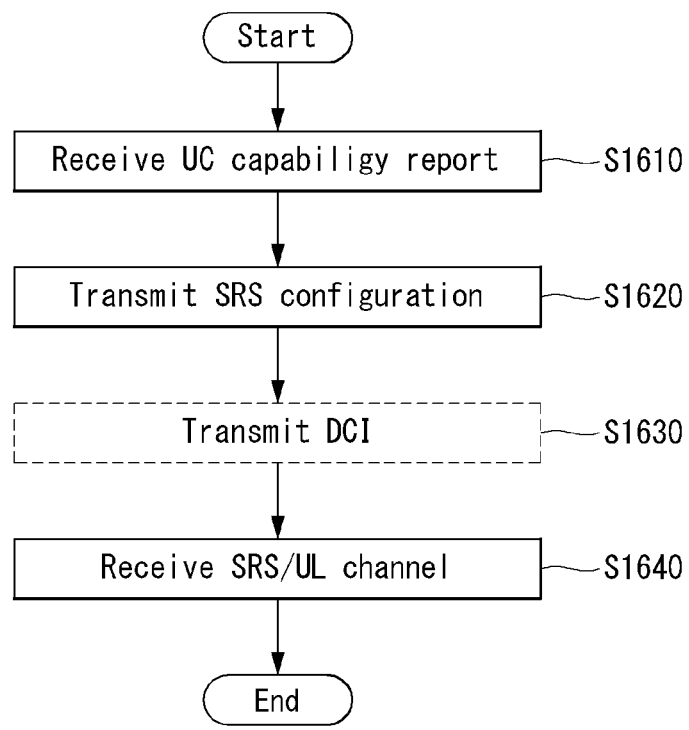
[FIG. 16]

[FIG. 17]
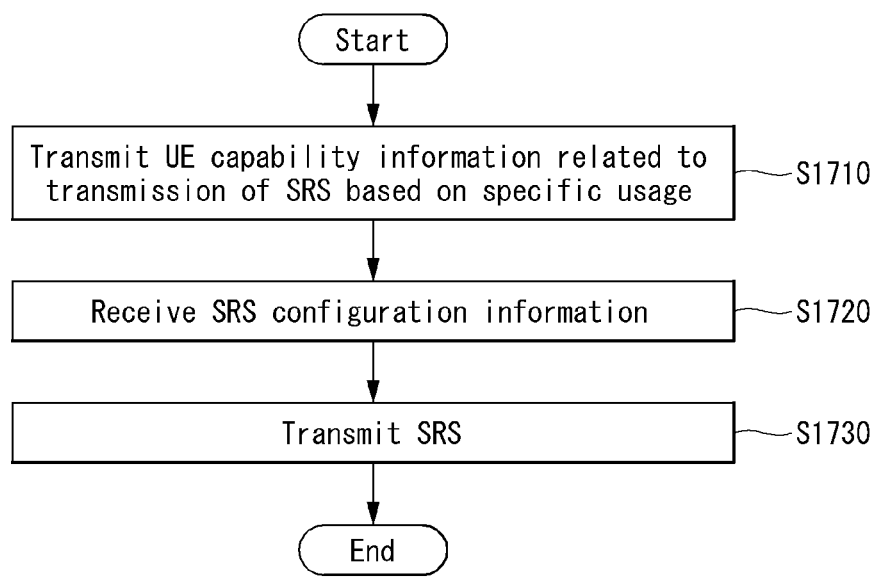

[FIG. 18]
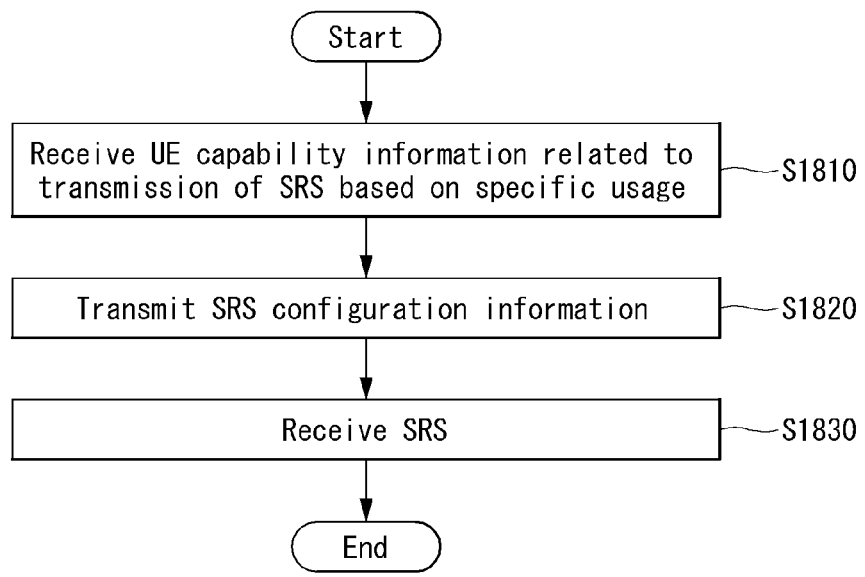

[FIG. 19]
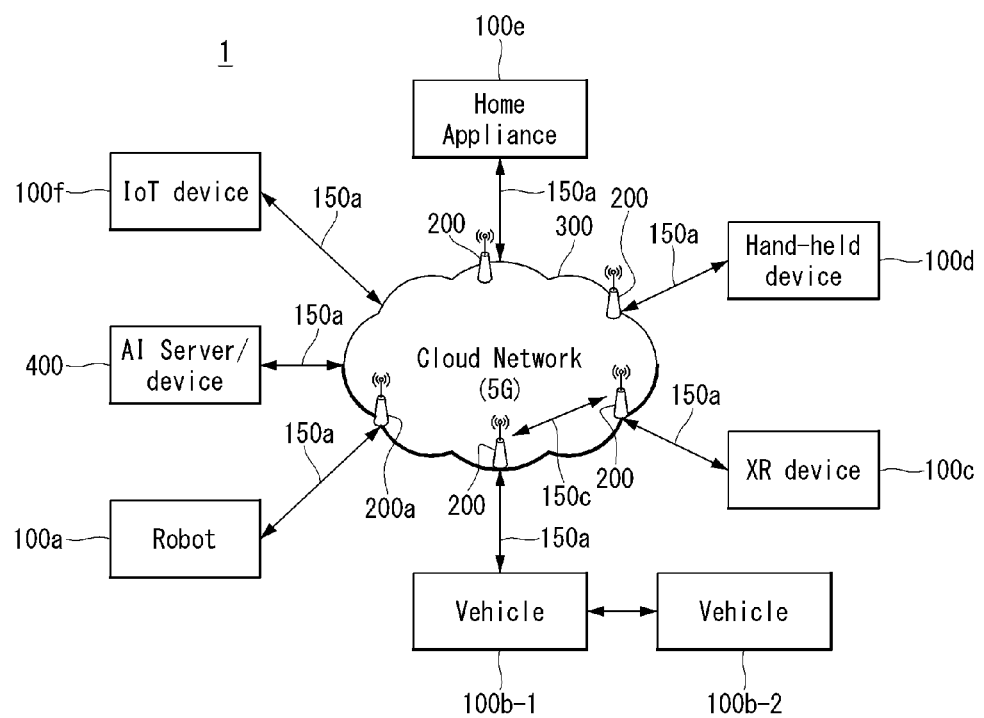

[FIG. 20]
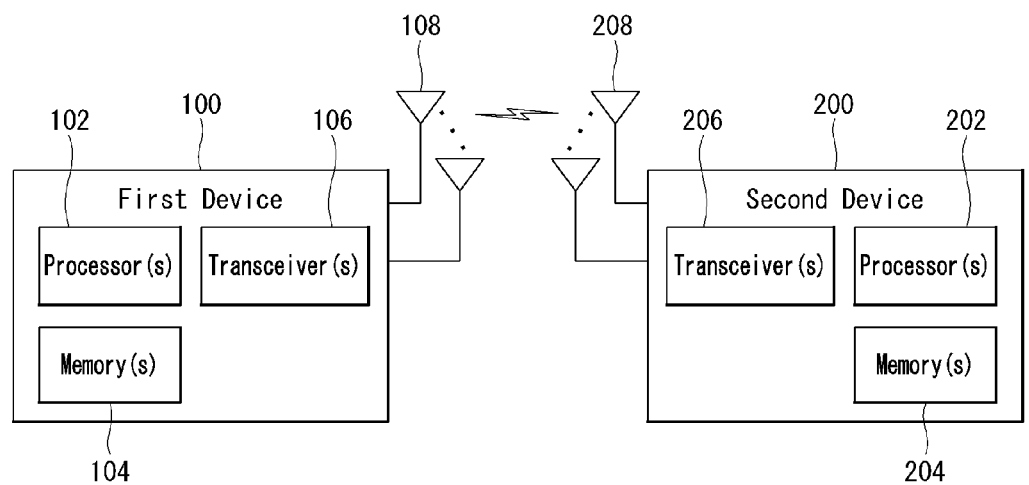

[FIG. 21]
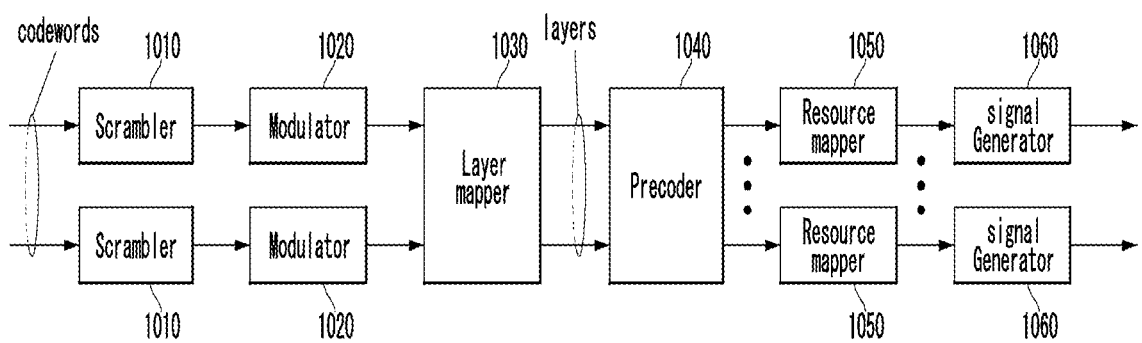

[FIG. 22]
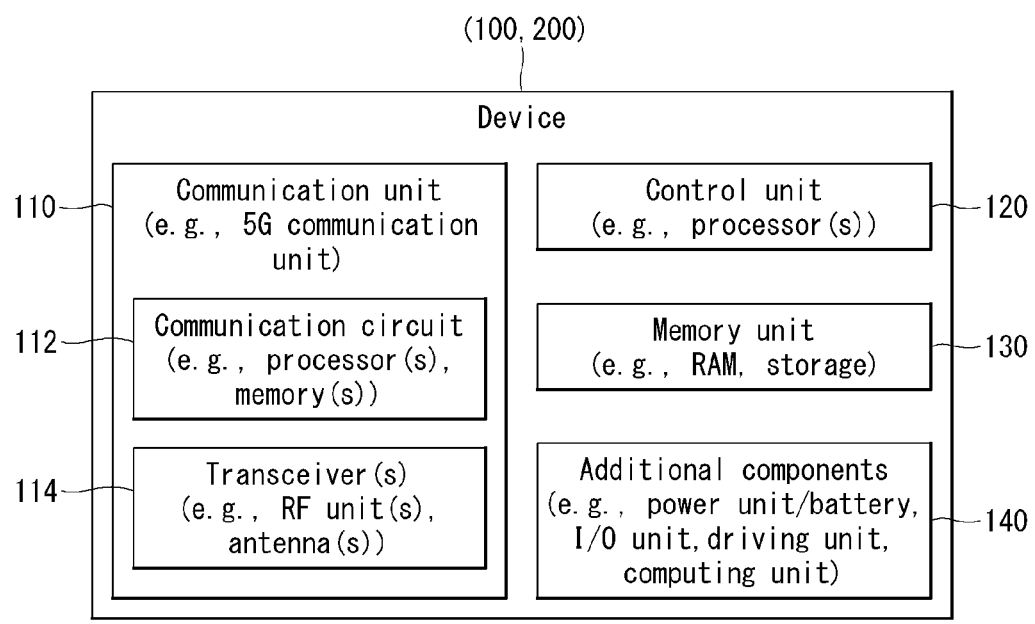

[FIG. 23]
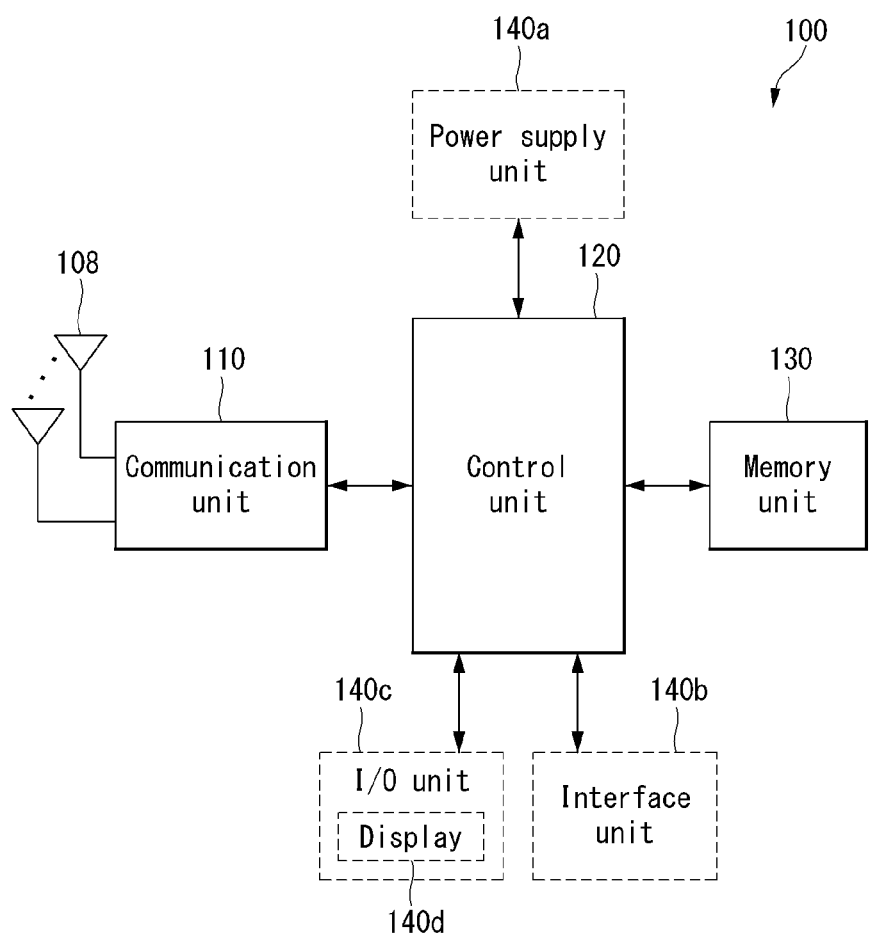

METHOD FOR TRANSMITTING AND RECEIVING SOUNDING REFERENCE SIGNAL IN WIRELESS COMMUNICATION SYSTEM AND DEVICE THEREFOR

CROSS-REFERENCE TO RELATED APPLICATIONS

This application is the national stage filing under 35 U.S.C. 371 of international application NO. PCT/KR2020/004348, filed on Mar. 30, 2020, which claims the benefit of U.S. Provisional application No. 62/825,751, filed on Mar. 28, 2019, the contents of which are all hereby incorporated by reference herein in their entirety.

TECHNICAL FIELD

The present disclosure relates to a method for transmitting and receiving a sounding reference signal in a wireless communication system and a device therefor.

BACKGROUND ART

A mobile communication system has been developed to provide a voice service while ensuring the activity of a user. However, the area of the mobile communication system has extended to a data service in addition to a voice. Due to the current explosive increase in traffic, there is a shortage of resources, and thus users demand a higher speed service. Accordingly, there is a need for a more advanced mobile communication system.

Requirements for a next-generation mobile communication system need to be able to support the accommodation of explosive data traffic, a dramatic increase in the data rate per user, the accommodation of a significant increase in the number of connected devices, very low end-to-end latency, and high-energy efficiency. To this end, various technologies, such as dual connectivity, massive multiple input multiple output (MIMO), in-band full duplex, non-orthogonal multiple access (NOMA), super wideband support, and device networking, are researched.

DISCLOSURE

Technical Problem

The present disclosure proposes a method for transmitting a sounding reference signal (SRS) by a multi-panel UE. In particular, the present disclosure proposes an SRS transmission method considering a panel switching capability of a UE incapable of simultaneous transmission through multi-panels.

The technical objects of the present disclosure are not limited to the aforementioned technical objects, and other technical objects, which are not mentioned above, will be apparently appreciated by a person having ordinary skill in the art from the following description.

Technical Solution

According to an embodiment of the present disclosure, a method for transmitting, by a user equipment (UE), a sounding reference signal (SRS) in a wireless communication system includes: transmitting UE capability information related to transmission of a sound reference signal (SRS) based on a specific usage; receiving configuration information related to transmission of the SRS; and transmitting the SRS.

The UE capability information is related to a plurality of panels, at least one SRS resource set is configured for each panel among the plurality of panels based on the UE capability information, and the SRS is transmitted based on any one panel of the plurality of panels.

The specific usage may be based on antenna switching, and the SRS resource set may include at least one SRS resource.

The UE capability information may include information on at least one of the number of antennas related to the transmission of the SRS, whether the SRS resource sets of each panel are simultaneously transmittable, or a panel switching delay.

The number of antennas related to the transmission of the SRS may be based on the number of plurality of panels and the number of antennas for each panel.

The UE capability information may include the number of plurality of panels, and the number of antennas related to the transmission of the SRS may be based on the number of antennas for each panel.

The number of plurality of panels may include at least one of the number of transmission (Tx) panels or the number of reception (Rx) panels.

Based on that the UE capability information includes information representing incapability of simultaneous transmission for the SRS resource sets of each panel, the panel switching delay may be included in the UE capability information.

The configuration information may include information on SRS resource setting related to the plurality of panels and the SRS resource setting includes a plurality of SRS resource sets for the plurality of panels.

The configuration information may include a guard period related to the panel switching delay, and the SRS resource setting may be configured based on the guard period.

The method may further include receiving downlink control information (DCI) for triggering the SRS, and the DCI may include information representing a panel related to the transmission of the SRS.

Based on that a panel related to reception of the DCI is different from the panel related to the transmission of the SRS, the SRS may be transmitted based on a predefined panel.

Based on that a time position at which the SRS is triggered belongs to the guard period related to the panel switching delay, the SRS may be transmitted based on a panel corresponding to a panel receiving the DCI or a panel configured as default among the plurality of panels.

Based on the time position at which the SRS is triggered deviates from the guard period related to the panel switching delay, the SRS may be transmitted based on the panel related to the transmission of the SRS.

According to another embodiment of the present disclosure, a UE for transmitting a sounding reference signal (SRS) in a wireless communication system includes: one or more transceivers; one or more processors; and one or more memories operably connectable to the one or more processors, and storing instructions of performing operations when the transmission of the SRS is executed by the one or more processors.

The operations include transmitting UE capability information associated with transmission of a sound reference signal (SRS) based on a specific usage, receiving configuration information related to transmission of the SRS, and transmitting the SRS.

The UE capability information is related to a plurality of panels, at least one SRS resource set is configured for each panel among the plurality of panels based on the UE capability information, and the SRS is transmitted based on any one panel of the plurality of panels.

According to yet another embodiment of the present disclosure, a device includes: one or more memories; and one or more processors functionally connected to the one or more memories.

The one or more processors control the device to transmit UE capability information associated with transmission of a sound reference signal (SRS) based on a specific usage, receive configuration information related to transmission of the SRS, transmit the SRS.

The UE capability information is related to a plurality of panels, at least one SRS resource set is configured for each panel among the plurality of panels based on the UE capability information, and the SRS is transmitted based on any one panel of the plurality of panels.

According to still yet another embodiment of the present disclosure, one or more non-transitory computer-readable media store one or more instructions.

The one or more instructions executable by one or more processors is configured to control a UE to transmit UE capability information associated with transmission of a sound reference signal (SRS) based on a specific usage, receive configuration information related to transmission of the SRS, and transmit the SRS.

The UE capability information is related to a plurality of panels, at least one SRS resource set is configured for each panel among the plurality of panels based on the UE capability information, and the SRS is transmitted based on any one panel of the plurality of panels.

According to still yet another embodiment of the present disclosure, a method for receiving, by a base station (BS), a sounding reference signal (SRS) in a wireless communication system includes: receiving UE capability information associated with transmission of a sound reference signal (SRS) based on a specific usage; transmitting configuration information related to transmission of the SRS; and receiving the SRS.

The UE capability information is related to a plurality of panels, at least one SRS resource set is configured for each panel among the plurality of panels based on the UE capability information, and the SRS is transmitted based on any one panel of the plurality of panels.

According to still yet another embodiment of the present disclosure, a BS for receiving a sounding reference signal (SRS) in a wireless communication system includes: one or more transceivers; one or more processors; and one or more memories operably connectable to the one or more processors, and storing instructions of performing operations when the reception of the SRS is executed by the one or more processors.

The operations include receiving UE capability information associated with transmission of a sound reference signal (SRS) based on a specific usage, transmitting configuration information related to transmission of the SRS, and receiving the SRS.

The UE capability information is related to a plurality of panels, at least one SRS resource set is configured for each panel among the plurality of panels based on the UE capability information, and the SRS is transmitted based on any one panel of the plurality of panels.

Advantageous Effects

According to an embodiment of the present disclosure, an SRS for an antenna switching usage, which is transmitted by a multi-panel UE is transmitted based on an SRS resource set configured for each panel. Accordingly, downlink channel state information can be obtained for each panel.

According to an embodiment of the present disclosure, UE capability information transmitted by a UE incapable of simultaneous transmission through multi-panels includes a panel switching delay. The configuration information related to the transmission of the SRS includes information on SRS resource setting including a plurality of resource sets for a plurality of panels. The SRS resource setting can be configured based on a guard period related to the panel switching delay. Accordingly, since the UE transmits the SRS within a range of a capability related to panel switching, reliability of SRS transmission for antenna switching can be secured.

According to an embodiment of the present disclosure, when a panel receiving downlink control information (DCI) for triggering the SRS and a panel indicated through the DCI are different, the SRS transmission is performed based on a predefined panel. The predefined panel varies depending on whether a time position at which the SRS is triggered belongs to the guard period related to the panel switching delay. Accordingly, the panel for the SRS transmission is clearly distinguished based on a UE capability (penal switching delay), so the ambiguity of a UE operation can be removed.

Effects which may be obtained by the present disclosure are not limited to the aforementioned effects, and other technical effects not described above may be evidently understood by a person having ordinary skill in the art to which the present disclosure pertains from the following description.

DESCRIPTION OF DRAWINGS

The accompanying drawings, which are included to provide a further understanding of the disclosure and constitute a part of the detailed description, illustrate embodiments of the disclosure and together with the description serve to explain the principle of the disclosure.

FIG. 1 is a diagram illustrating an example of an overall system structure of NR to which a method proposed in the present disclosure may be applied.

FIG. 2 illustrates a relationship between an uplink frame and a downlink frame in a wireless communication system to which a method proposed in the present disclosure may be applied.

FIG. 3 illustrates an example of a frame structure in an NR system.

FIG. 4 illustrates an example of a resource grid supported by a wireless communication system to which a method proposed in the present disclosure may be applied.

FIG. 5 illustrates examples of a resource grid for each antenna port and numerology to which a method proposed in the present disclosure may be applied.

FIG. 6 illustrates physical channels and general signal transmission used in a 3GPP system.

FIG. 7 illustrates an example of beam forming using SSB and CSI-RS.

FIG. 8 is a flowchart for illustrating a downlink beam management procedure using SSB.

FIG. 9 illustrates for illustrating a downlink beam management procedure using CSI-RS.

FIG. 10 is a diagram for explaining a procedure for determining a reception beam in a downlink beam management procedure using CSI-RS.

FIG. 11 is a diagram for explaining a procedure for determining a transmission beam in a downlink beam management procedure using CSI-RS.

FIG. 12 is a diagram for explaining resource allocation in time and frequency domains in a downlink beam management procedure using CSI-RS.

FIG. 13 is a diagram for explaining an uplink beam management procedure using SRS.

FIG. 14 is a flowchart illustrating an uplink beam management procedure using SRS.

FIG. 15 is a flowchart for describing an operation of a UE to which a method proposed in the present disclosure may be applied.

FIG. 16 is a flowchart for describing an operation of a BS to which a method proposed in the present disclosure may be applied.

FIG. 17 is a flowchart for describing a method for transmitting, by a UE, a sounding reference signal in a wireless communication system according to an embodiment of the present disclosure.

FIG. 18 is a flowchart for describing a method for receiving, by a BS, a sounding reference signal in a wireless communication system according to another embodiment of the present disclosure.

FIG. 19 illustrates a communication system 1 applied to the present disclosure.

FIG. 20 illustrates a wireless device applicable to the present disclosure.

FIG. 21 illustrates a signal processing circuit for a transmission signal.

FIG. 22 illustrates another example of a wireless device applied to the present disclosure.

FIG. 23 illustrates a portable device applied to the present disclosure.

MODE FOR DISCLOSURE

A detailed description to be disclosed below together with the accompanying drawing is to describe exemplary embodiments of the present disclosure and not to describe a unique embodiment for carrying out the present disclosure. The detailed description below includes details to provide a complete understanding of the present disclosure. However, those skilled in the art know that the present disclosure may be carried out without the details.

In some cases, in order to prevent a concept of the present disclosure from being ambiguous, known structures and devices may be omitted or illustrated in a block diagram format based on core functions of each structure and device.

Hereinafter, downlink (DL) means communication from the base station to the terminal and uplink (UL) means communication from the terminal to the base station. In downlink, a transmitter may be part of the base station, and a receiver may be part of the terminal. In uplink, the transmitter may be part of the terminal and the receiver may be part of the terminal. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), AR (Augmented Reality) device, VR (Virtual Reality) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, an Unmanned Aerial Vehicle (UAV), AR (Augmented Reality) device, VR (Virtual Reality) device, and the like.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. Matters disclosed in a standard document opened before the present disclosure may be referred to for a background art, terms, abbreviations, etc., used for describing the present disclosure. For example, the following documents may be referred to.

3GPP LTE
36.211: Physical channels and modulation
36.212: Multiplexing and channel coding
36.213: Physical layer procedures
36.300: Overall description
36.331: Radio Resource Control (RRC)
3GPP NR
38.211: Physical channels and modulation
38.212: Multiplexing and channel coding
38.213: Physical layer procedures for control
38.214: Physical layer procedures for data
38.300: NR and NG-RAN Overall Description
36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the present disclosure, the technology is called new RAT for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billion. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas.

Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a new RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. Different numerologies may be defined by scaling reference subcarrier spacing to an integer N.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 1 illustrates an example of an overall structure of an NR system to which a method proposed in the present disclosure is applicable.

Referring to FIG. 1, an NG-RAN is configured with an NG-RA user plane (new AS sublayer/PDCP/RLC/MAC/PHY) and gNBs which provide a control plane (RRC) protocol end for a user equipment (UE).

The gNBs are interconnected through an Xn interface.

The gNBs are also connected to an NGC through an NG interface.

More specifically the gNBs are connected to an access and mobility management function (AMF) through an N2 interface and to a user plane function (UPF) through an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

The NR supports multiple numerologies (or subcarrier spacing (SCS)) for supporting various 5G services. For example, when the SCS is 15 kHz, a wide area in traditional cellular bands is supported and when the SCS is 30 kHz/60 kHz, dense-urban, lower latency, and wider carrier bandwidth are supported, and when the SCS is 60 kHz or higher therethan, a bandwidth larger than 24.25 GHz is supported in order to overcome phase noise.

An NR frequency band is defined as frequency ranges of two types (FR1 and FR2). FR1 and FR2 may be configured as shown in Table 2 below. Further, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} y/1000) \cdot T_s=1$ ms. In this case, there may be a set of UL frames and a set of DL frames.

FIG. 2 illustrates a relation between an uplink frame and a downlink frame in a wireless communication system to which a method proposed in the present disclosure is applicable.

As illustrated in FIG. 2, uplink frame number i for transmission from a user equipment (UE) shall start $T_{TA}=N_{TA}T_s$ before the start of a corresponding downlink frame at the corresponding UE.

Regarding the numerology μ, slots are numbered in increasing order of $n_s^\mu \in \{0, \ldots, N_{subframe}^{slots,\mu}-1\}$ within a subframe and are numbered in increasing order of $n_{s,f}^\mu \in \{0, \ldots, N_{frame}^{slots,\mu}-1\}$ within a radio frame. One slot consists of consecutive OFDM symbols of $N_{symb}^\mu$, and $N_{symb}^\mu$ is determined depending on a numerology used and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame,\mu}$ of slots per radio frame, and the number $N_{slot}^{subframe,\mu}$ of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame,\mu}$ | $N_{slot}^{frame,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{frame,\mu}$ |
|---|---|---|---|
| 2 | 12 | 40 | 4 |

FIG. 3 illustrates an example of a frame structure in a NR system. FIG. 3 is merely for convenience of explanation and does not limit the scope of the present disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In relation to physical resources in the NR system, an antenna port, a resource grid, a resource element, a resource block, a carrier part, etc., may be considered.

Hereinafter, the above physical resources that may be considered in the NR system are described in more detail.

First, in relation to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. In this case, the large-scale properties may include at least one of delay spread, Doppler spread, frequency shift, average received power, and received timing.

FIG. 4 illustrates an example of a resource grid supported in a wireless communication system to which a method proposed in the present disclosure is applicable.

Referring to FIG. 4, a resource grid consists of $N_{RB}^\mu N_{sc}^{RB}$ subcarriers on a frequency domain, each subframe consisting of 14·2μ OFDM symbols, but the disclosure is not limited thereto.

In the NR system, a transmitted signal is described by one or more resource grids, consisting of $N_{RB}^\mu N_{sc}^{RB}$ subcarriers, and $2^\mu N_{symb}^{(\mu)}$ OFDM symbols, where $N_{RB}^\mu \leq N_{RB}^{max,\mu}$. $N_{RB}^{max,\mu}$ denotes a maximum transmission bandwidth and may change not only between numerologies but also between uplink and downlink.

In this case, as illustrated in FIG. 5, one resource grid may be configured per numerology μ and antenna port p.

FIG. 5 illustrates examples of a resource grid per antenna port and numerology to which a method proposed in the present disclosure is applicable.

Each element of the resource grid for the numerology μ and the antenna port p is called a resource element and is uniquely identified by an index pair (k,l), where k=0, . . . , $N_{RB}^\mu N_{sc}^{RB}-1$ is an index on a frequency domain, and l=0, . . . , $2^\mu N_{symb}^{(\mu)}-1$ refers to a location of a symbol in a subframe. The index pair (k,l) is used to refer to a resource element in a slot, where l=0, . . . , $N_{symb}^\mu-1$.

The resource element (k,l) for the numerology μ and the antenna port p corresponds to a complex value $a_{k,l}^{(p,\mu)}$. When there is no risk for confusion or when a specific antenna port or numerology is not specified, the indexes p and μ may be dropped, and as a result, the complex value may be $a_{k,l}^{(p)}$ or $a_{k,l}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block number $n_{CRB}^\mu$ in the frequency domain and resource elements (k, l) for the subcarrier spacing configuration μ may be given by the following Equation 1.

$$n_{CRB}^\mu = \left\lfloor \frac{k}{N_{sc}^{RB}} \right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}$ where i is No. of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start}$$ [Equation 2]

Here, $N_{BWP,i}^{start}$ may be the common resource block where the BWP starts relative to the common resource block 0.

Physical Channel and General Signal Transmission

FIG. 6 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (COI), a Precoding Matrix Index (PMI), a Rank Indicator (RI), and the like. The UE may transmit the control information such as the CQI/PMI/RI, etc., through the PUSCH and/or PUCCH.

Beam Management (BM)

A BM procedure as layer 1 (L1)/layer 2 (L2) procedures for acquiring and maintaining a set of base station (e.g., gNB, TRP, etc.) and/or terminal (e.g., UE) beams which may be used for downlink (DL) and uplink (UL) transmission/reception may include the following procedures and terms.

Beam measurement: Opeation of measuring characteristics of a beam forming signal received by the eNB or UE.

Beam determination: Operation of selecting a transmit (Tx) beam/receive (Rx) beam of the eNB or UE by the eNB or UE.

Beam sweeping: Operation of covering a spatial region using the transmit and/or receive beam for a time interval by a predetermined scheme.

Beam report: Operation in which the UE reports information of a beamformed signal based on beam measurement.

The BM procedure may be divided into (1) a DL BM procedure using a synchronization signal (SS)/physical broadcast channel (PBCH) Block or CSI-RS and (2) a UL BM procedure using a sounding reference signal (SRS). Further, each BM procedure may include Tx beam sweeping for determining the Tx beam and Rx beam sweeping for determining the Rx beam.

DL Beam Management (DL BM) Procedure

The DL BM procedure may include (1) transmission of beamformed DL reference signals (RSs) (e.g., CIS-RS or SS Block (SSB)) of the eNB and (2) beam reporting of the UE.

Here, the beam reporting a preferred DL RS identifier (ID)(s) and L1-Reference Signal Received Power (RSRP).

The DL RS ID may be an SSB Resource Indicator (SSBRI) or a CSI-RS Resource Indicator (CRI).

FIG. 7 illustrates an example of beamforming using SSB and CSI-RS.

As illustrated in FIG. 7, an SSB beam and a CSI-RS beam may be used for the beam management. A measurement metric is an L1-RSRP for each resource/block. The SSB may be sued for coarse beam management and the CSI-RS may be sued for fine beam management. The SSB may be used for both the Tx beam sweeping and the Rx beam sweeping. The Rx beam sweeping using the SSB may be performed while the UE changes the Rx beam for the same SSBRI across multiple SSB bursts. Here, one SS burst includes one or more SSBs and one SS burst set includes one or more SSB bursts.

1. DL BM Using SSB

FIG. 8 is a flowchart showing an example of a downlink beam management procedure using SSB.

A configuration for beam report using the SSB is performed during a CSI/beam configuration in an RRC connected state (or RRC connected mode).

The UE receives from the eNB CSI-ResourceConfig IE including CSI-SSB-ResourceSetList including SSB resources used for the BM (S810).

Table 5 shows an example of CSI-ResourceConfig IE and as shown in Table 5, a BM configuration using the SSB is not separately defined and the SSB is configured like the CSI-RS resource.

TABLE 5

```
-- ASN1START
-- TAG-CSI-RESOURCECONFIG-START
CSI-ResourceConfig ::=         SEQUENCE {
   csi-ResourceConfigId        CSI-ResourceConfigId,
   csi-RS-ResourceSetList      CHOICE {
      nzp-CSI-RS-SSB           SEQUENCE {
         nzp-CSI-RS-ResourceSetList     SEQUENCE (SIZE
(1..maxNrofNZP-CSI-RS-ResourceSetsPerConfig)) OF NZP-CSI-RS-
ResourceSetIdOPTIONAL,
         csi-SSB-ResourceSetList        SEQUENCE (SIZE
```

TABLE 5-continued

```
(1..maxNrofCSI-SSB-ResourceSetsPerConfig)) OF CSI-SSB-
ResourceSetIdOPTIONAL
    },
    csi-IM-ResourceSetList       SEQUENCE (SIZE
(1..maxNrofCSI-IM-ResourceSetsPerConfig)) OF CSI-IM-ResourceSetId
    },
    bwp-Id                       BWP-Id,
    resourceType                 ENUMERATED { aperiodic,
semiPersistent, periodic },
    ...
}
-- TAG-CSI-RESOURCECONFIGTOADDMOD-STOP
-- ASN1STOP
```

In Table 5, csi-SSB-ResourceSetList parameter represents a list of SSB resources used for beam management and reporting in one resource set. Here, SSB resource set may be configured as {SSBx1, SSBx2, SSBx3, SSBx4, . . . }. SSB index may be defined as 0 to 63.

The UE receives from the eNB the SSB resource based on the CSI-SSB-ResourceSetList (S820).

When CSI-RS reportConfig associated with reporting of SSBRI and L1-RSRP is configured, the UE (beam) reports to the eNB best SSBRI and L1-RSRP corresponding thereto (S830).

In other words, when reportQuantity of the CSI-RS reportConfig IE is configured as 'ssb-Index-RSRP', the UE reports to the eNB best SSBRI and L1-RSRP corresponding thereto.

In addition, when the CSI-RS resource is configured in the same OFDM symbol(s) as SSB (SS/PBCH Block) and 'QCL-TypeD' is applicable, the UE may assume that the CSI-RS and the SSB are quasi co-located from the viewpoint of 'QCL-TypeD'.

Here, the QCLTypeD may mean that antenna ports are QCL from the viewpoint of a spatial Rx parameter. When the UE receives a plurality of DL antenna ports having a QCL Type D relationship, the same Rx beam may be applied. Further, the UE does not expect that the CSI-RS is configured in an RE overlapped with the RE of the SSB.

2. DL BM Procedure Using CSI-RS

When the UE receives a configuration of NZP-CSI-RS-ResourceSet with (higher layer parameter) repetition configured to 'ON', the UE may assume that at least one CSI-RS resource in NZP-CSI-RS-ResourceSet is transmitted to the same downlink spatial domain transmission filter.

In other words, at least one CSI-RS resource in NZP-CSI-RS-ResourceSet is transmitted through the same Tx beam.

Here, at least one CSI-RS resource in NZP-CSI-RS-ResourceSet may be transmitted to different OFDM symbols or transmitted in different frequency domain (i.e. through FDM).

When the UE is a multi-panel UE, at least one CSI-RS resource is a target of FDM.

In addition, when the repetition is configured to "ON", it is related to the Rx beam sweeping procedure of the UE.

The UE does not expect that different periodicities are received at periodicityAndOffset in all CSI-RS resources in NZP-CSI-RS-Resourceset.

In addition, when repetition is configured to 'OFF', the UE does not assume that at least one CSI-RS resource in NZP-CSI-RS-ResourceSet is transmitted to the same downlink spatial domain transmission filter.

In other words, at least one CSI-RS resource in NZP-CSI-RS-ResourceSet is transmitted through different Tx beams.

When the repetition is configured to "OFF", it is related to the Tx beam sweeping procedure of the eNB.

In addition, the repetition parameter may be configured only for CSI-RS resource sets associated with CSI-ReportConfig having a report of L1 RSRP or 'No Report (or None)'.

When the UE is configured with CSI-ReportConfig in which reportQuantity is configured as 'cri-RSRP' or 'none', the UE may be configured only with the same number of port (1-port or 2-port) having higher layer parameter 'nrof-Ports' for all CSI-RS resources in NZP-CSI-RS-ResourceSet. Here, CSI-ResourceConfig does not include the higher layer parameter "trs-Info" but includes NZP-CSI-RS-ResourceSet configured to the higher layer parameter "repetition" (=ON).

More specifically, with respect to the purpose of the CSI-RS, if parameter repetition is configured and TRS_info is not configured in a specific CSI-RS resourceset, the CSI-RS is used for beam management.

In addition, if parameter repetition is not configured and TRS_info is configured, the CSI-RS is used as a TRS (Tracking Reference Signal).

In addition, if neither parameter repetition nor TRS_info is configured, the CSI-RS is used for CSI acquisition.

FIG. 9 illustrates an example of a downlink beam management procedure using a Channel State Information-Reference Signal (CSI-RS).

(a) of FIG. 9 illustrates an Rx beam determination (or refinement) procedure of the UE and (b) of FIG. 9 illustrates a Tx beam sweeping procedure of the eNB. Further, (b) of FIG. 9 illustrates a case where the repetition parameter is configured to 'ON' and (b) of FIG. 9 illustrates a case where the repetition parameter is configured to 'OFF'.

Referring to (a) of FIG. 9 and FIG. 10, an Rx beam determination process of the UE will be described.

FIG. 10 is a flowchart showing an example of a RX beam determination process of a UE in the DL BM procedure using CSI-RS.

In the FIG. 10, the UE receives, from the eNB, NZP CSI-RS resource set IE including higher layer parameter repetition through RRC signaling (S1010). Here, the repetition parameter is configured to 'ON'.

The UE repeatedly receives a resource(s) in CSI-RS resource set configured as repetition 'ON' in different OFDM symbols through the same Tx beam (or DL spatial domain transmission filter) of the eNB (S1020).

The UE determines the Rx beam thereof (S1030).

The UE may skip a CSI report and transmit a CSI report including CRI/L1-RSRP to the eNB (S1040).

In this case, reportQuantity of CSI report config may be configured as "No report (or None)" or CRI and L1-RSRP".

That is, when repetition is configured to "ON", the UE may skip the CSI report or report ID information (CRI) of a beam pair related priority beam and a quality value (L1-RSRP) thereof.

Referring to (b) of FIG. 9 and FIG. 11, a Tx beam determination process of the eNB will be described.

FIG. 11 is a flowchart showing an example of a TX beam determination process of an eNB.

The UE receives, from the eNB, NZP CSI-RS resource set IE including higher layer parameter repetition through RRC signaling (S1110).

Here, the repetition parameter is configured to 'OFF' and associated with the Tx beam sweeping procedure of the eNB.

The UE receives a resource(s) in CSI-RS resource set configured as repetition 'OFF' through different Tx beams (DL spatial domain transmission filters) of the eNB (S1120).

The UE selects (or determines) a best beam (S1130), and reports to the eNB an ID for the selected beam and related quality information (e.g., L1-RSRP) (S1140).

In this case, reportQuantity of CSI report config may be configured as 'CRI+L1-RSRP'. In other words, when the CSI-RS is transmitted for the BM, the UE reports to the eNB the CRI and L1-RSRP therefor.

FIG. 12 illustrates an example of resource allocation in time and frequency domains associated with an operation of FIG. 9.

Referring to FIG. 12, when repetition 'ON' is configured in the CSI-RS resource set, a plurality of CSI-RS resources is repeatedly used via the same Tx beam. When repetition 'OFF' is configured in the CSI-RS resource set, different CSI-RS resources are transmitted via different Tx beams.

3. DL BM Associated Beam Indication

The UE may be RRC-configured with a list for a maximum of M candidate Transmission Configuration Indication (TCI) states at least for a purpose of Quasi Co-location (QCL) indication. Here, the M may be 64.

Each TCI state may be configured as one RS set. One of DL RS types including SSB, P-CSI RS, SP-CSI RS, A-CSI RS, and the like may be at least referred to for an ID of each DL RS for a purpose of spatial QCL (QCL Type D) in the RS set.

Initialization/update of the ID of the DL RS(s) in the RS set used for the purpose of the spatial QCL may be at least performed through explicit signaling.

Table 6 shows an example of TCI-State IE.

The TCI-State IE is associated with a quasi co-location (QCL) type corresponding to one or two DL reference signals (RSs).

TABLE 6

```
-- ASN1START
-- TAG-TCI-STATE-START
TCI-State ::=           SEQUENCE {
    tci-StateId             TCI-StateId,
    qcl-Type1               QCL-Info,
    qcl-Type2               QCL-Info
    ...
}
QCL-Info ::=            SEQUENCE {
    cell                    ServCellIndex
    bwp-Id                  BWP-Id
    referenceSignal         CHOICE {
        csi-rs                  NZP-CSI-RS-ResourceId,
        ssb                     SSB-Index
    },
    qcl-Type                ENUMERATED {typeA, typeB, typeC,
                            typeD},
    ...
}
-- TAG-TCI-STATE-STOP
-- ASN1STOP
```

In Table 6, bwp-Id parameter represents DL BWP in which the RS is located, cell parameter represents a carrier in which the RS is located, and reference signal parameter represents a reference antenna port(s) which becomes a source of quasi co-location for a corresponding target antenna port(s) or a reference signaling including the same. The target antenna port(s) may be CSI-RS, PDCCH DMRS, or PDSCH DMRS. As an example, corresponding TCI state ID may be indicated for NZP CSI-RS resource configuration information in order to indicate QCL reference RS information for NZP CSI-RS. As another example, the TCI state ID may be indicated for each CORESET configuration in order to indicate QCL reference information for a PDCCH DMRS antenna port(s). As yet another example, the TCI state ID may be indicated through DCI in order to indicate QCL reference information for a PDSCH DMRS antenna port(s).

4. QCL (Quasi-Co Location)

The antenna port is defined so that a channel in which the symbol on the antenna port is transported may be inferred from a channel in which different symbols on the same antenna port are transported. When a property of a channel in which a symbol on one antenna port is transported may be inferred from a channel in which symbols on different antenna ports are transported, two antenna ports may have a quasi co-located or quasi co-location (QC/QCL) relationship.

Here, the channel property includes at least one of a delay spread, a Doppler spread, a frequency/Doppler shift, average received power, received timing/average delay, and a spatial Rx parameter. Here, the spatial Rx parameter means a spatial (receive) channel property parameter such as angle of arrival.

The UE may be configured as a list of up to M TCI-State configurations in higher layer parameter PDSCH-Config in order to decode the PDSCH according to detected PDCCH having an intended DCI for the corresponding UE and a given serving cell. The M depends on a UE capability.

Each TCI-State includes a parameter for configuring a quasi co-location relationship between one or two DL reference signals and a DM-RS port of the PDSCH.

The quasi co-location relationship is configured as higher layer parameter qcl-Type1 for a first DL RS and qcl-Type2 (when configured) for a second DL RS. Two DL RSs are not the same as each other in terms of QCL type regardless of whether two DL RS are DL RSs having the same reference or DL RSs having different references.

A quasi co-location type corresponding to each DL RS may be given by higher layer parameter qcl-Type of QCL-Info and may take one of the following values.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, when a target antenna port is specific NZP CSI-RS, corresponding NZP CSI-RS antenna ports may be indicated/configured to be QCL with specific TRS from the viewpoint of QCL-Type A and specific SSB from the viewpoint of QCL-Type D. The UE that receives the indication/configuration may receive the corresponding NZP CSI-RS by using a Doppler delay value measured in QCL-TypeA TRS and apply an Rx beam used for receiving QCL-TypeD SSB to reception of the corresponding NZP CSI-RS.

The UE may receive an activation command by MAC CE signaling used for mapping up to eight TCI states to codepoint of DCI field "Transmission Configuration Indication'.

UL BM Procedure

In the case of UL BM, beam reciprocity (or beam correspondence) between the Tx beam and the Rx beam may be established or not established according to UE implementation. If the reciprocity between the Tx beam and the Tx beam is established in both the eNB and the UE, a UL beam pair may be matched through a DL beam pair. However, when the reciprocity between the Tx beam and the Rx beam is not established even in any one of the eNB and the UE, a UL beam pair determination process is required apart form DL beam pair determination.

Further, even when the eNB and the UE maintain beam correspondence, the eNB may use a UL BM procedure in order to determine a DL Tx beam without requesting report of a preferred beam by the UE.

The UL BM may be performed through beamformed UL SRS transmission and whether to apply UL BM of the SRS resource set is configured by a (higher layer parameter) usage. When the usage is configured as 'BeamManagement (BM)', only one SRS resource may be transmitted to each of a plurality of SRS resource sets at a given time instant.

The UE may be configured with one or more Sounding Reference Symbol (SRS) resource sets configured by (higher layer parameter) SRS-ResourceSet (through higher layer signaling, RRC signaling, etc.). For each SRS resource set, the UE may be configured with K 1) SRS resources (higher later parameter SRS-resources). Here, K is a natural number and a maximum value of K is indicated by SRS_capability.

Similarly to the DL BM, a UL BM procedure may also be divided into Tx beam sweeping of the UE and Rx beam sweeping of the eNB.

FIG. 13 illustrates an example of an uplink beam management procedure using a Sounding Reference Signal (SRS).

(a) of FIG. 13 illustrates an Rx beam determination procedure of the eNB and (b) of FIG. 13 illustrates a Tx beam sweeping procedure of the UE.

FIG. 14 is a flowchart showing an example of an uplink beam management procedure using the SRS.

The UE receives, from the eNB, RRC signaling (e.g., SRS-Config IE) including a (higher layer parameter) usage parameter configured as 'beam management' (S1410).

Table 7 shows an example of SRS-Config Information Element (IE) and SRS-Config IE is used for an SRS transmission configuration. SRS-Config IE includes a list of SRS-Resources and a list of SRS-ResourceSets. Each SRS resource set means a set of SRS-resources.

The network may trigger transmission of the SRS resource set by using configured aperiodicSRS-Resource-Trigger (L1 DCI).

TABLE 7

```
-- ASN1START
-- TAG-MAC-CELL-GROUP-CONFIG-START
SRS-Config ::=                          SEQUENCE {
    srs-ResourceSetToReleaseList        SEQUENCE (SIZE(1..maxNrofSRS-
ResourceSets)) OF SRS-ResourceSetId         OPTIONAL, -- Need N
    srs-ResourceSetToAddModList         SEQUENCE (SIZE(1..maxNrofSRS-
ResourceSets)) OF SRS-ResourceSet           OPTIONAL, -- Need N
    srs-ResourceToReleaseList           SEQUENCE (SIZE(1..maxNrofSRS-
Resources)) OF SRS-ResourceId               OPTIONAL, -- Need N
    srs-ResourceToAddModList            SEQUENCE (SIZE(1..maxNrofSRS-
Resources)) OF SRS-Resource                 OPTIONAL, -- Need N
    tpc-Accumulation                    ENUMERATED {disabled}
    ...
}
SRS-ResourceSet ::=                     SEQUENCE {
    srs-ResourceSetId                   SRS-ResourceSetId,
    srs-ResourceIdList                  SEQUENCE (SIZE(1..maxNrofSRS-
ResourcesPerSet)) OF QRS-ResourceId         OPTIONAL, -- Cond Setup
    resourceType                        CHOICE {
        aperiodic                       SEQUENCE {
            aperiodicSRS-ResourceTrigger        INTEGER (1..maxNrofSRS–
TriggerStates–1),
            csi-RS                      NZR-CSI-RS-ResourceId
            slotOffset                  INTEGER (1..32)
            ...
        },
        semi-persistent                 SEQUENCE {
            associatedCSI-RS            NZP-CSI-RS-ResourceId
            ...
        },
        periodic                        SEQUENCE {
            associatedCSI-RS            NZP-CSI-RS-ResourceId
            ...
        }
    },
    usage                               ENUMERATED {beamManagement,
codebook, nonCodebook, antennaSwitching},
    alpha                               Alpha
    p0                                  INTEGER (–202..24)
    pathlossReferenceRS                 CHOICE {
        ssb-Index                       SSB-Index,
        csi-RS-Index                    NZP-CSI-RS-ResourceId
SRS-SpatialRelationinfo ::=             SEQUENCE {
    servingCellId                       ServCellIndex
    referenceSignal                     CHOICE {
```

TABLE 7-continued

```
ssb-Index                SSB-Index,
csi-RS-Index             NZP-CSI-RS-ResourceId,
srs                      SEQUENCE {
    resourceId               SRS-ResourceId,
    uplinkBWP                BWP-Id
    }
  }
}
}
SRS-ResourceId ::=       INTEGER (0..maxNrofSRS-Resources-1)
```

In Table 7, usage represents a higher layer parameter indicating whether the SRS resource set is used for the beam management or whether the SRS resource set is used for codebook based or non-codebook based transmission. The usage parameter corresponds to L1 parameter 'SRS-SetUse'. 'spatialRelationInfo' is a parameter representing a configuration of a spatial relation between a reference RS and a target SRS. Here, the reference RS may become SSB, CSI-RS, or SRS corresponding to L1 parameter 'SRS-SpatialRelationInfo'. The usage is configured for each SRS resource set.

The UE determines a Tx beam for an SRS resource to be transmitted based on SRS-SpatialRelation Info included in the SRS-Config IE (S1420). Here, SRS-SpatialRelation Info is configured for each SRS resource and represents a beam which is the same as the beam used in the SSB, the CSI-RS, or the SRS is to be applied for each SRS resource. Further, SRS-SpatialRelationInfo may be configured or not configured in each SRS resource.

If SRS-SpatialRelationInfo is configured in the SRS resource, SRS-SpatialRelationInfo is transmitted by applying the beam which is the same as the beam used in the SSB, the CSI-RS, or the SRS. However, if SRS-SpatialRelationInfo is not configured in the SRS resource, the UE arbitrarily determines the Tx beam and transmits the SRS through the determined Tx beam (S1430).

More specifically, for P-SRS in which 'SRS-ResourceConfigType' is configured as 'periodic':

i) When SRS-SpatialRelationInfo is configured as 'SSB/PBCH', the UE transmits the corresponding SRS resource by applying a spatial domain transmission filter which is the same as a spatial domain Rx filter used for receiving the SSB/PBCH (or generated from the corresponding filter); or ii) When SRS-SpatialRelationInfo is configured as 'CSI-RS', the UE transmits the SRS resource by applying the same spatial domain transmission filter used for receiving periodic CSI-RS or SP CSI-RS; or iii) When SRS-SpatialRelationInfo is configured as 'SRS', the UE transmits the SRS resource by applying the same spatial domain transmission filter used for transmitting the periodic CSI-RS.

Even when 'SRS-ResourceConfigType' is configured as 'SP-SRS' or 'AP-SRS', beam determination and transmission operations may be applied similarly thereto.

Additionally, the UE may receive or not receive a feedback for the SRS from the eNB like three following cases (S1440).

i) When Spatial_Relation_Info is configured for all SRS resources in the SRS resource set, the UE transmits the SRS with the beam indicated by the eNB. For example, when all Spatial_Relation_Info indicates the same SSB, CRI, or SRI, the UE repeatedly transmits the SRS with the same beam. This case as a usage of selecting the Rx beam by the eNB corresponds to (a) of FIG. 13.

ii) Spatial_Relation_Info may not be configured for all SRS resources in the SRS resource set. In this case, the UE may transmit the SRS while arbitrarily changing the SRS beam. In other words, this case as a usage of selecting the Tx beam by the UE corresponds to (b) of FIG. 13.

iii) Spatial_Relation_Info may be configured for some SRS resources in the SRS resource set. In this case, the SRS may be transmitted with the beam configured for the configured SRS resource and the UE may arbitrarily transmit the SRS by applying the Tx beam to an SRS resource in which Spatial_Relation_Info is not configured.

Hereinafter, an SRS for antenna switching will be described in detail.

SRS for 'antennaSwitching'

The SRS may be used for acquisition of DL channel state information (CSI) (i.e., DL CSI acquisition). As a specific example, in a single cell or multi cell (e.g., CA) situation based on TDD, a base station (BS) may schedule transmission of the SRS to a user equipment (UE), and then measure the SRS from the UE. In this case, the BS may perform scheduling of a DL signal/channel to the UE based on measurement by the SRS by assuming DL/UL reciprocity. In this case, in relation to DL CSI acquisition based on the SRS, the SRS may be configured for an antenna switching usage.

As an example, according to a specification (e.g., 3gpp TS38.214), the usage of the SRS may be configured to the BS and/or the UE by using a higher layer parameter (e.g., a usage of RRC parameter SRS-ResourceSet). In this case, the usage of the SRS may be configured as a beam management usage, a codebook transmission usage, a non-codebook transmission usage, an antenna switching usage, etc.

Hereinafter, a case where the SRS transmission (i.e., transmission of an SRS resource or an SRS resource set) is configured for the antenna switching usage among the usages will be described in detail.

As an example, in the case of a terminal with partial reciprocity, SRS transmission based on antenna switching (i.e., transmission antenna switching) may be supported for downlink (DL) channel state information (CSI) acquisition through the SRS transmission in a situation such as time division duplex (TDD). When the antenna switching is applied, approximately 15 μs may be required between SRS resources (and/or the SRS resource and the resource between PUSCH/PUCCH) in a general case for the antenna switching of the UE. By considering such a point, a (minimum) guard period shown in Table 8 below may be defined.

TABLE 8

| μ | $\Delta f = 2^\mu \cdot 15$ [kHz] | Y [symbol] |
|---|---|---|
| 0 | 15 | 1 |
| 1 | 30 | 1 |

TABLE 8-continued

| μ | $\Delta f = 2^\mu \cdot 15$ [kHz] | Y [symbol] |
|---|---|---|
| 2 | 60 | 1 |
| 3 | 120 | 2 |

In Table 8, μ represents numerology, Δf represents a subcarrier spacing, and Y represents the number of symbols of the guard period, i.e., a length of the guard period. Referring to Table 8, the guard period may be configured based on a parameter μ for determining the numerology. In the guard period, the UE may be configured not to transmit any other signal, and the guard period may be configured to be intactly used for the antenna switching. As an example, the guard period may be configured by considering SRS resources transmitted in the same slot. In particular, when the UE is configured and/or instructed to transmit an aperiodic SRS configured to intra-slot antenna switching, the corresponding UE may transmit the SRS by using different transmission antennas for each designated SRS resource, and the guard period may be configured between respective resources.

Further, when the UE is configured with the SRS resource and/or the SRS resource set configured for the antenna switching usage through the higher layer signaling, the corresponding UE may be configured to perform the SRS transmission based on the UE capability related to the antenna switching. Here, the capability of the UE related to the antenna switching may be '1T2R', '2T4R', '1T4R', '1T4R/2T4R', '1T1R', '2T2R', '4T4R', etc. Here, 'mTnR' may mean a UE capability supporting m transmissions and n receptions.

(Sample S1) For example, in the case of a UE that supports 1T2R, up to two SRS resource sets may be configured as different values for resourceType of a higher layer parameter SRS-ResourceSet. Here, each SRS resource set may have two SRS resources transmitted in different symbols, and each SRS resource may constitute a single SRS port in a given SRS resource set. Further, an SRS port for a second SRS resource in the SRS resource set may be configured to be associated with a different UE antenna port from an SRS port for a first SRS resource in the same SRS resource set.

(Sample S2) As another example, in the case of a UE that supports 2T4R, up to two SRS resource sets may be configured as different values for resourceType of the higher layer parameter SRS-ResourceSet. Here, each SRS resource set may have two SRS resources transmitted in different symbols, and each SRS resource may constitute a single SRS port in a given SRS resource set. Further, an SRS port pair for the second SRS resource in the SRS resource set may be configured to be associated with a different UE antenna port from the SRS port pair for the first SRS resource in the same SRS resource set.

(Sample S3) As yet another example, in the case of a UE that supports 1T4R, the SRS resource sets may be configured in different schemes according to whether the SRS transmission is configured to be periodic, semi-persistent, and/or aperiodic. First, when the SRS transmission is configured to be periodic or semi-persistent, one SRS resource set constituted by 0 SRS resource set or four SRS resources configured based on for the resourceType of the higher layer parameter SRS-ResourceSet may be configured to be transmitted in different symbols. In this case, each SRS resource may constitute the single SRS port in the given SRS resource set, and the SRS port for each SRS resource may be configured to be associated with different UE antenna ports. Unlike this, when the SRS transmission is configured to be aperiodic, two SRS resource sets constituted by 0 SRS resource set or a total of four SRS resources configured based on for the resourceType of the higher layer parameter SRS-ResourceSet may be configured to be transmitted in different symbols of two different slots. In this case, the SRS ports for respective SRS resources in two given SRS resource sets may be configured to be associated with different UE antenna ports.

(Sample S4) As still yet another example, in the case of the UE that supports 1T1R, 2T2R, or 4T4R, up to two SRS resource sets of which each is constituted by one SRS resource may be configured for the SRS transmission, and the number of SRS ports of each SRS resource may be configured to 1, 2, or 4.

When an indicated UE capability is 1T4R/2T4R, the corresponding UE may expect that SRS ports (e.g., 1 or 2) of the same number will be configured for all SRS resources in the SRS resource set(s). Further, when the indicated UE capability is 1T2R, 2T4R, 1T4R, or 1T4R/2T4R, the corresponding UE may not expect that one or more SRS resource sets configured for the antenna switching usage in the same slot will be configured or triggered. Further, even when the indicated UE capability is 1T1R, 2T2R, or 4T4R, the corresponding UE may not expect that one or more SRS resource sets configured for the antenna switching usage in the same slot will be configured or triggered.

[Start of Present Disclosure]

The contents described above may be applied in combination with methods proposed in the present disclosure to be described below or may be supplemented to clarify technical features of the methods proposed in the present disclosure. Methods to be described below are just distinguished for convenience and it is needless to say that some components of any one method may be substituted with some components of another method or may be applied in combination with each other.

Hereinafter, matters related to the SRS transmission of the multi-panel UE will be described in detail.

It is assumed that SRS transmission for antenna switching for efficiently acquiring the downlink channel state information (DL CSI) is supported for a UE in which the number of transmission antennas (Tx antennas) is smaller than the number of reception antennas (Rx antennas) in Rel-15 NR MIMO. The UE that supports the antenna switching may report, to the BS, one of {"1T2R", "1T4R", "2T4R", "1T4R/2T4R", "T=R"} as the UE capability information, and the BS may configure the SRS resource set and the SRS resource for the antenna switching corresponding to the corresponding UE capability, and indicate the transmission. Further, the BS should configure a symbol gap according to numerology to be set between resources (as the guard period) at the time of configuring a time domain position of the resource in the SRS resource set for the antenna switching usage by considering an antenna switching time required for the antenna switching of the UE. More specific contents are described in Table 8 above and a description thereof.

Enhancement for panel-specific UL transmission is performed in Rel-16 NR eMIMO, and when a concept of 'panel' is introduced even in an antenna switching procedure, issues which should be additionally considered may occur, which include multi-panel simultaneous transmission, a beam indication for each panel, a panel switching time, etc. In the present disclosure, an antenna switching operation of the multi-panel UE will be clearly defined by considering the above-described issues, and an antenna switching configuring/indicating method of the BS for the corresponding operation, and a subsequent UE operation will be described.

Hereinafter, agreements related to multi-beam enhancement which may be applied to the method proposed in the present disclosure will be described.

1. Agreement (Panel-Specific UL Transmission)

In Rel-16, an identifier (ID) is supported, which may be used for representing the panel-specific UL transmission. The corresponding identifier may be utilizing or modifying an existing definition. Alternatively, the corresponding identifier may be newly defined.

2. Agreement (Number of Spatial Relations for PUCCH)

For UL beam management latency reduction in controlling PUCCH spatial relation, the maximum RRC configurable number of spatial relations for PUCCH (i.e., maxNrofSpatialRelationInfos) is increased to be 64 per BWP.

3. Agreement (ID for Panel-Specific UL Transmission)

The identifier (ID) which may be used for representing the panel-specific UL transmission may be one of the following Alt.1 to Alt.4.

Alt.1: SRS resource set ID
Alt.2: ID, which is directly associated to a reference RS resource and/or resource set
Alt.3: ID, which is directly associated to a reference RS resource and/or resource set
Alt.4: ID which is additionally configured in spatial relation info The multi-panel UE (MPUE) may be classified as follows.

MPUE-Assumption1: Multiple panels are implemented on a UE and only one panel can be activated at a time, with panel switching/activation delay of [X] ms.

MPUE-Assumption2: Multiple panels are implemented on a UE and multiple panels can be activated at a time and one or more panels can be used for transmission.

MPUE-Assumption3: Multiple panels are implemented on a UE and multiple panels can be activated at a time but only one panel can be used for transmission.

The multi-panel UE may be based on any one of MPUE assumption-1 to MPUE assumption-3. However, according to an implementation scheme of the multi-panel UE, the multi-panel UE may be based on at least one of assumption-1 to assumption-3 described above. Further, the classification of the multi-panel UE is just an example, and the multi-panel UE may be classified differently from the listed scheme.

Hereinafter, an antenna switching configuring/indicating method of the BS for the multi-panel UE, and a UE/BS operating method according to the corresponding method will be proposed.

As described above, the multi-panel UE may be classified into three following types.

A UE in which multiple panels may not be simultaneously activated and only one panel may be activated at one timing. The corresponding UE may be based on MPUE-assumption 1 above.

A UE in which multiple panels may be simultaneously activated and one or more multiple panels are utilizable even at the time of transmission. The corresponding UE may be based on MPUE-assumption 2 above.

A UE in which multiple panels may be simultaneously activated and only one panel is utilizable at the time of transmission. The corresponding UE may be based on MPUE-assumption 3 above.

Proposals to be described below may be a proposal corresponding only to one type of UE among three types of UEs, and on the contrary, may also be a proposal corresponding all of two types or three types of UEs.

[Proposal 1]

Hereinafter, a UE capability for the panel switching operation and the SRS resource setting for the panel switching will be described.

The numbers of Tx panels and Tx panels which are utilizable by the UE may be defined as a UE capability. When the number of Tx panels is equal to or smaller than the number of Rx panels, a 'panel switching' operation of transmitting the SRS for each panel for acquiring the downlink channel state information (DL CSI) for each panel may be defined/configured.

The UE capability for the panel switching may be defined as the following formats.

"1Tp2Rp" (=one Tx panel two Rx panel)
"2Tp4Rp" (=two Tx panel four Rx panel)
"1Tp4Rp" (=one Tx panel four Rx panel)

The UE may report, to the BS, capability information for the panel switching.

When the SRS resource set(s) for the antenna switching usage may be configured for each panel, whether the corresponding SRS resource set(s) configured for each panel may be simultaneously transmitted may be defined as a capability.

Specifically, whether the BS may configure an individual SRS resource set(s) configured for each panel in the same slot or/and whether the BS may transmit the individual SRS resource set(s) or even whether the BS may configure SRS resources included in the individual SRS resource set configured for each panel in the same symbol and/or whether the UE may transmit the SRS resources may be defined as the UE capability.

When the capability of the UE is "1Tp2Rp", the existing Rel-15 NR antenna switching (e.g., "1T2R") may be indicated for each Rx panel. The UE may have the SRS resource set for the antenna switching usage related to each Rx panel. In this case, the SRS resource set for the antenna switching usage may be configured to the UE for each Rx panel. In this case, a concept of "1Tp2Rp" may be a higher level concept than "1T2R" by one step. A set (i.e., SRS resource setting for panel switching) of a higher concept enclosing a plurality of SRS resource sets from each panel needs to be newly defined.

Further, the multi-panel UE may report the capability information for the antenna switching equally or differently per panel.

For example, a case where a panel switching capability of a 2-panel UE is "1Tp2Rp", and "1T2R" is supported in a first panel and "1T4R" is supported in a second panel for each panel is assumed. In this case, in the capability related to the SRS resource setting for the panel switching, the UE may be configured to report, to the BS, integrated capability information by considering hierarchies of the panel switching and the antenna switching as in {"1Tp2Rp" with "1T2R" for panel0 and "1T4R" for panel1}. Through this, the BS may configure/indicate, to the UE, the SRS for the panel switching and the antenna switching corresponding to the corresponding capability information.

Additionally, whether the SRS may be simultaneously transmitted based on the SRS resource set related to each panel and/or a time required for switching the panel may be included in the integrated capability information. For example, the UE may report, to the BS, capability information such as {"1Tp2Rp" with "1T2R" for panel0 and "1T4R" for panel1, whether the SRS resource set of each panel may be simultaneously transmitted (O or X), and the time required for switching the panel}.

The following configuration/indication may be considered with respect to which SRS resource set is related to which panel.

Specifically, in a higher layer configuration for configuring the SRS resource set from the BS (e.g., within SRS-ResourceSet which is IE of 3gpp TS 38.331 SRS-config), which panel the corresponding SRS resource set corresponds to may be configured/indicated.

The panel configuration/indication may be delivered to the DL CSI report of the UE, and the BS. When the UE reports the downlink channel state information (DL CSI) based on reception of the CSI-RS after reporting the number of Tx panels and the number of Rx panels, the UE may make a panel index be included. Through this, the BS may acquire a channel situation for each panel, and reflect the acquired channel situation to the SRS resource setting. The UE may report the integrated capability information for the SRS resource setting for panel switching according to a configuration/indication between the corresponding SRS resource set and the UE panel, and may operate based on a subsequent BS configuration/indication for the panel switching.

Hereinafter, an embodiment of the integrated capability information will be described.

[Method 1-1]

In the case of the UE in which one or multiple panels are utilizable at the time of transmission like MPUE-assumption 2, the integrated capability information may be reported as follows.

The corresponding UE may report, to the BS, capability information such as {"1Tp2Rp" with "1T2R" for panel0 and "1T4R" for panel, whether the SRS resource set of each panel may be simultaneously transmitted: 0, and the time required for switching the panel: 0 ms (optional)}.

The integrated capability information may include the information on whether the SRS resource set may be simultaneously transmitted. Further, the integrated capability information may optionally include the information on the panel switching delay.

[Method 1-2]

In the case of the UE in which only one panel is utilizable at the time of transmission like MPUE-assumption 1 and MPUE-assumption 3, the integrated capability information may be reported as follows.

The corresponding UE may report, to the BS, capability information such as {"1Tp2Rp" with "1T2R" for panel0 and "1T4R" for panel, whether the SRS resource set of each panel may be simultaneously transmitted: X, and the time required for switching the panel: 2 ms (reporting is required)}.

The integrated capability information may include the information on whether the SRS resource set may be simultaneously transmitted and the panel switching delay. The panel switching delay may be requisitely included in the integrated capability information.

The reporting of the panel switching delay may be required or optional according to whether the SRS resource set may be simultaneously transmitted. The reason is that if the SRS resource set may be simultaneously transmitted, only a time required for turning on the panel (a time required for activating the panel) without considering the panel switching delay is considered.

[Method 1-3]

Items included in the integrated capability information based on Method 1-1 and/Method 1-2 above may be individually reported. As an example, the UE may individually report, to the BS, the information on the panel switching delay or whether the SRS resource set may be simultaneously transmitted.

[Proposal 2]

Hereinafter, a method for reducing inter-SRS beam interference at the time of an SRS configuration for the UE capable of simultaneously transmitting multi-panels (e.g., UE of MPUE-assumption 2) and at the time of simultaneously transmitting multi-panels will be described.

In the multi-panel UE (MPUE-assumption 2) in which multi-panels may be simultaneously activated, and one or a plurality of panels is utilizable even at the time of uplink transmission, if an SRS resource for the antenna switching usage is connected to different UE panels, SRS resources of each panel may be utilized for transmitting an SRS resource of another panel. Specifically, the BS may configure/instruct to the UE to transmit the SRS of another panel simultaneously (in the same symbol) in an SRS resource of any one panel among the multi-panels.

Specifically, the SRS resource set for the antenna switching for each panel of the multi-panel UE may separately exist. For convenience of description, this is referred to as an SRS resource set per panel. The term is just used for distinguishing from an SRS resource set without a panel related limitation, and a technical scope is not intended to be limited to the corresponding term.

The BS may configure the SRS resource set for each of the plurality of panels to the corresponding UE in the same slot. In other words, the BS may configure SRS resource sets based on different panels in the same slot.

Further, the BS may configure the SRS resource which belongs to the SRS resource set for each of the plurality of panels in the same slot. The corresponding UE may transmit SRSs based on different panels in the same symbol.

It is impossible for a UE based on MPUE-assumption 1 and MPUE-assumption 3 in which only one panel is utilizable at the time of uplink transmission to simultaneously respective SRSs through the SRS resources based on different panels. The operation of the UE based on MPUE-assumption 2 described above is impossible. Accordingly, the panel switching delay should be considered between SRS transmissions from different panels.

Further, the following operation may be considered so as to minimize inter-beam interference between the SRS resources simultaneously transmitted by the UE (in the multi-panels).

The BS may i) configure only one time domain symbol level location of the SRSA resource or ii) configure the time domain symbol level location in a time domain symbol level position candidate set form, to the UE.

When the simultaneously transmitted SRS resources are configured/triggered through the configuration, the BS may configure/indicate/update each SRS resource so that SRS beam interference from two panels is minimized through MAC/CE/DCI. That is, the BS may configure/indicate/update a combination in which the beam interference is minimized in the set, to the UE.

The following matters related to channel estimation for the UE such as MPUE-assumption 2 capable of simultaneously transmitting the SRSs based on different panels may be considered. In order to increase a channel estimation capability for the SRSs transmitted based on different panels (based on the SRS resource of the SRS resource set for each of different panels) in the same symbol, it may be preferable that the SRS is transmitted through an orthogonal beam between respective SRS resources. Here, orthogonal may mean that directions of respective beams are different, so the beams do not overlap with each other.

In order to improve the channel estimation capability of the BS, the inter-beam interference of he SRSs which are simultaneously transmitted based on different panels may be considered.

For example, when candidate positions of the symbol level position of the SRS resource are indexed from a last symbol of the subframe as 0 to 5, the UE/BS may operate as in Samples 1 and 2 below according to a consecutive symbol duration value. For reference, in the case of Rel-15 NR, a starting potion is configured to one of 0 to 5 through RRC and consecutive symbol numbers 1, 2, and 4 are configured.

Sample 1) When the consecutive symbol duration is 1: The BS may configure the symbol level position candidate set to the UE through the RRC as follows.

SRS resource 1 (from panel 1)={3, 5}
SRS resource 2 (from panel 1)={3, 5}
SRS resource 3 (from panel 2)={3, 5}
SRS resource 4 (from panel 2)={3, 5}

The BS may indicate a specific combination among the candidate sets to the UE through the MAC CE/DCI as follows.

SRS resource 1 (from panel 1)={3}
SRS resource 2 (from panel 1)={5}
SRS resource 3 (from panel 2)={5}
SRS resource 4 (from panel 2)={3}

The BS may configure/indicate/update whether SRS resource 1 and SRS resource 4 are simultaneously transmitted and SRS resource 2 and SRS resource 3 are simultaneously transmitted through the MAC CE or DCI n bits.

Through a dynamic configuration/indication for the symbol level position for the SRS resource as described above, the inter-beam interference of the SRS resources to be simultaneously transmitted from the respective panels may be minimized.

The method may reduce signaling overhead, and when the number of panels of the UE which are simultaneously transmitted is larger than 2, the corresponding effect t may be prominent.

Specifically, the signaling overhead is reduced in a configuration between the BS and the UE to arrange the beams so that the inter-beam interference is small by configuring the candidates at the symbol level position of each SRS resource as compared with updating all spatial relations in order to reduce the inter-beam interference of the respective SRS resources transmitted from different panels.

Further, the embodiment may be applied to a case where SRSs of a plurality of UEs are multiplexed in a limited time-frequency domain. In order to reduce SRS inter-beam interference of UEs scheduled to simultaneously transmit the SRSs, the BS may configure the symbol level position of the SRS resource of each UE.

Sample 2) When the consecutive symbol duration is 2 or more: The BS may configure/indicate a symbol level starting position candidate and symbol durations 1, 2, and 4 to the UE through the RRC in a combination form.

SRS resource 1 (from panel 1)={(starting=3,duration=2), (starting=5,duration=1)}
SRS resource 2 (from panel 1)={(starting=3,duration=2), (starting=5,duration=1)}
SRS resource 3 (from panel 2)={(starting=3,duration=2), (starting=5,duration=1)}
SRS resource 4 (from panel 2)={(starting=3,duration=2), (starting=5,duration=1)}

The BS may configure/indicate by which order pair the configured sets are to be down-selected and transmitted for each SRS resource among the configured sets through the MAC CE or DCI n bits.

The operation between the BS and the UE may be extensively applied even to a case where the number of panels of the UE is 3 or more (e.g., 4). A configuration/indication of information (e.g., a candidate set configuration, and an indication of a specific set among the candidate sets) according to Proposal 2 above may be related to the SRS resource setting for the panel switching of Proposal 1 above. As an example, the candidate set may be configured/indicated through the SRS resource setting for the panel switching.

[Proposal 3]

Hereinafter, an SRS configuration in a UE (e.g., a UE of MPUE-assumption 1 or MPUE-assumption 3) in which simultaneous transmission of multi-panels is impossible, an SRS configuration considering the panel switching delay, and a UE/BS operation related to the corresponding configuration will be described.

In a UE (MPUE-assumption 1) in which multi-panels may not be activated simultaneously and only one panel may be activated at one timing and a UE (MPUE-assumption 3) in which multi-panels may be activated, but only one panel is utilizable at the time of transmission, the following method may be considered.

When the SRS resource set for the antenna switching usage is connected to different UE panels in the above-described UE (based on MPUE-assumption 1 or MPUE-assumption 3), the BS may configure the SRS resource setting by considering a time (e.g., panel switching delay) required for the corresponding UE to switch the panel.

Specifically, the BS may configure a guard period or a gap period for panel switching between respective SRS resource sets. Accordingly, the ambiguity on the UE operation may be prevented.

The 'guard period for panel switching' may be configured/indicated through the SRS resource setting for panel switching of Proposal 1 above. That is, the SRS resource setting may be constituted by a combination of SRS resource sets (SRS resource sets for antenna switching) configured for each panel by considering the guard period for panel switching.

In other words, the SRS resource set for antenna switching and the SRS resource setting for panel switching may be configured in a hierarchical structure. Specifically, in each panel, at least one SRS resource set for antenna switching may be configured. In this case, the SRS resource setting for panel switching, which may bind (or includes) the configured sets (by considering the 'guard period for panel switching') may be configured. An example of UE capability information (Proposal 1) related thereto is as follows.

{"1Tp2Rp" with "1T2R" for panel0 and "1T4R" for panel, whether the SRS resource set of each panel may be simultaneously transmitted: X, and the time required for switching the panel: 2 ms (reporting is required)}

The BS may configure the guard period for panel switching by utilizing the SRS resource setting for panel switching. Specifically, the BS may configure the 'guard period for panel switching' by setting a slot level time domain gap considering the panel switching delay for each UE capability between the 'SRS resource sets for antenna switching' of each panel.

The BS may configure the SRS resource set for antenna switching from each panel throughout one or two slots in the same manner as the existing REL-15. The BS may configure the SRS resource in a form considering a symbol gap for antenna switching in the corresponding slot.

Through the scheme, the BS may configure/indicate, to the UE, the 'guard period for panel switching' and the 'symbol gap for antenna switching' in the hierarchical structure.

According to an embodiment, the UE/BS may operate in relation to the SRS resource setting for panel switching as follows.

It is assumed that the UE incapable of simultaneously transmitting the SRS resource, such as MPUE-assumption 1 and MPUE-assumption 3 includes two panels and the antenna switching related capability for each panel is "1T2R". In this case, the UE may report, to the BS, that the UE capability related to the antenna switching is "1T4R" by considering up to the panel switching.

The UE may support up to the panel switching by maintaining the antenna switching capability of the existing scheme. The UE may separately report, to the BS, only the guard period for panel switching)(e.g., 2 ms or the number of slots)' as the UE capability.

The operation of the UE may be performed in a UE capability range during the panel switching through the operation between the BS and the UE.

The time (e.g., panel switching delay) required for switching the panel of each panel may be defined as the UE capability (e.g., the guard period for panel switching) as described above. The UE reports the corresponding capability to the BS not to expect the SRS resource sets from each panel, which are configured/indicated in a state to be separated at a smaller time interval than the corresponding delay. The BS may configure/indicate the SRS resource setting for panel switching so as to place the guard period for panel switching between the SRS resource sets of each panel by considering the reported capability information (panel switching delay). When an SRS transmission indication to another panel is received from the BS within the 'guard period for panel switching' of the UE, the corresponding SRS transmission indication is discarded or the indicated SRS is transmitted by maintaining a previously transmitted panel as it is.

There may be SRS resource sets (SRS resource sets for antenna switching) for two or more (e.g., four) panels within panel switching SRS resource setting.

[Proposal 4]

Hereinafter, a UE operation when the panel receiving the DCI for triggering the SRS and the panel to transmit the SRS do not match each other will be described.

In a UE (MPUE-assumption 1) in which multi-panels may not be simultaneously activated, and only one panel may be activated at one timing and in a UE (MPUE-assumption 3) in which multi-panels may be simultaneously activated, but only one panel is utilizable at the time of transmission, the following method may be considered.

When a panel switching guard period is defined as the UE capability information, the Rx panel receiving the DL/UL DCI for triggering the SRS and the Tx panel of the indicated SRS may be different. In this case, the UE may operate as follows.

1) If a temporal location of the SRS triggered from a DCI reception timing is after the panel switching guard period, the UE may normally transmit the SRS after the panel switching in response to the DCI indication.

2) If the temporal location of the SRS triggered from the DCI reception timing is within the panel switching guard period, the UE may use a pre-defined default UL panel. The pre-defined default UL panel may include a UL panel corresponding to a lowest CORESET, and a pre-defined/configured fallback UL panel.

Alternatively, the UE may transmit the SRS by using a UL panel which corresponds to (or is the same as) a DL panel (Rx panel) used when receiving the DCI.

Hereinafter, an example of a UE/BS operation based on at least one of Proposals 1 to 4 described above is as follows.

Step 0) The UE reports, to the BS, a panel related capability (the number of Tx/Rx panels, whether multi-panels may be simultaneously transmitted, and the panel switching delay).

Step 0-1) Perform reporting as in Proposal 1

Step 0-1-1) Simultaneous transmission for each panel is possible→Proposal 2

Step 0-1-2) Simultaneous transmission for each panel is impossible→Proposal 3

Step 1) The UE receives the SRS configuration from the BS.

Step 1-1) Receive a configuration for transmitting the SRS

Step 0-1-1) Information which may be included in the configuration is (TS 38.331 SRS-Config)

Step 1-2) Transmit the SRS peroiodically/semi-statically/aperiodically

Step 2) When a) A timing when the UE receives, from the BS, SRS trigger through UL/DL grant (through PDCCH) or b) an RRC/MAC CE configuration based on SRS transmission timing arrives Step 2-1) UE capable of simultaneous transmission for each panel Step 2-1-1) Operation by Proposal 2

Step 2-2) UE incapable of simultaneous transmission for each panel

Step 2-2-1) Operation by Proposal 3

Step 2-3) When the SRS is triggered through the DCI, but the DCI receiving panel and the panel to transmit the SRS are different Step 2-3-1) Operation by Proposal 4

All of the respective steps are not required, and some step may be omitted according to a situation of the UE.

Hereinafter, effects according to Proposals 1 to 4 will be described in detail.

The effect according to Proposal 1 is as follows. When beamforming is utilized (in a band of FR 2 or more), a channel situation between multi-panels mounted on the BS and the UE may vary for each panel. When the number of Tx panels is equal to or smaller than the number of Rx panels, it is possible to acquire the DL CSI for each panel.

The effect of Proposal 2 is as follows. By considering the panel switching delay which may have a larger switching gap than the existing NR antenna switching, simultaneous transmission from multi-panels may be supported in transmitting the SRS for the antenna switching usage. Further, an arrangement of SRS beams of each panel, which are transmitted in the same symbol may be performed so that interference between respective SRS beams is small. The location of the SRS resource may be dynamically configured/indicated so that the inter-beam interference of the simultaneously transmitted SRSs is small.

The effect of Proposal 3 is as follows. When the UE antenna switching for the DL CSI acquisition usage is supported even between two or more panels, a UE operation considering the panel switching period is defined. An impractical UE operation may be prevented by considering a time (e.g., panel switching delay) required for the UE which may not utilize two panels together for transmission to switch the panel. That is, since the UE transmits the SRS within a range of a capability related to panel switching, reliability of SRS transmission for antenna switching may be secured.

The effect of Proposal 4 is as follows. When the Rx panel receiving the DL/UL DCI in which the SRS is triggered and the Tx panel of the indicated SRS are different, the ambiguity of the UE operation may be resolved, which may occur according to the UE capability.

In terms of implementation, the operations (e.g., operations related to the SRS based on at least one of Proposals 1 to 4) of the BS/UE according to the above-described embodiments may be processed by devices (e.g., processors 102 and 202 in FIG. 20) in FIGS. 19 to 23 to be described below.

Further, the operations (e.g., operations related to the SRS based on at least one of Proposals 1 to 4) of the BS/UE according to the above-described embodiments may be stored in memories (e.g., reference numerals 104 and 204 in FIG. 20) in the form of a command/program (e.g., instruction or executable code) for driving at least one processor (e.g., reference numerals 102 and 202 in FIG. 20).

Hereinafter, the above-described embodiments will be described in terms of the operations of the UE/BS with reference to FIGS. 15 and 16.

FIG. 15 is a flowchart for describing an operation of a UE to which a method proposed in the present disclosure may be applied. FIG. 15 is just for convenience of the description and does not limit the scope of the present disclosure.

Referring to FIG. 15, a case where in performing the CSI acquisition/reporting operation, the UE performs uplink transmission (e.g., UL channel, additional SRS, etc.) based on the above-described embodiments is assumed.

The UE may report, to the BS, a panel related UE capability (e.g., a UE capability related to panel based SRS transmission/panel switching) (S1510). As an example, the UE may perform UE capability reporting as in step 0) of the above-described method, and this may be performed through the higher layer signaling. In this case, the UE may also report information on the UE capability related to CSI acquisition/reporting.

The UE may receive, from the BS, the SRS configuration related to the CSI acquisition/reporting (S1520). As an example, as in step 1) of the above-described method, the UE may receive an SRS configuration including information related to transmission of the SRS (e.g., SRS-config). In this case, the corresponding SRS configuration may be delivered through the higher layer signaling.

The UE may receive the SRS related to the operation of the CSI acquisition/reporting and/or DCI related to transmission such as the UL channel (S1530). However, the corresponding step may also be replaced with the RRC configuration/MAC CE as mentioned in step 2) of the above-described method.

Thereafter, in the operation of the CSI acquisition/reporting, the UE may transmit the SRS and/or the UL channel(s) based on the received SRS configuration, DCI, and/or a pre-defined (e.g., priority rule, etc.) (S1540). As an example, in multi symbol SRS transmission, the UE may transmit the SRS and/or UL channel(s) based on the rule (e.g., specifically, Proposals 2, 3, and 4) described in the above-described method.

The above-described operation of the UE may be implemented by using the devices described in FIGS. 19 to 23, and some of entities may be omitted. For example, referring to FIG. 20, at least one processor 102/202 may control to transmit and receive channel/signal/data/information (e.g., SRS configuration, UL/DL DCI, additional SRS, PDCCH, PDSCH, PUSCH, PUCCH, PHICH, etc) by using at least one transceiver 106/206, and also control to store channel/signal/data/information to be transmitted or received in at least one memory 104/204.

FIG. 16 is a flowchart for describing an operation of a BS to which a method proposed in the present disclosure may be applied. FIG. 16 is just for convenience of the description and does not limit the scope of the present disclosure.

Referring to FIG. 16, a case where in performing the CSI acquisition/reporting operation, the BS receives uplink transmission (e.g., UL channel, additional SRS, etc.) based on the above-described embodiments is assumed.

The BS may report, from the BS, a report for the panel related UE capability (e.g., a UE capability related to the panel based SRS transmission/panel switching) (S1610). As an example, the BS may receive UE capability reporting as in step 0) of the above-described method, and this may be performed through the higher layer signaling. In this case, the UE may also report the information on the UE capability related to CSI acquisition/reporting.

The BS may transmit, to the UE, the SRS configuration related to the CSI acquisition/reporting operation (S1620). As an example, as in step 1) of the above-described method, the BS may transmit, to the UE, an SRS configuration including information related to transmission of the SRS (e.g., SRS-config). In this case, the corresponding SRS configuration may be delivered through the higher layer signaling.

The BS may transmit, to the UE, the SRS related to the CSI acquisition/reporting operation and/or DCI related to transmission such as the UL channel (S1630). However, the corresponding step may also be replaced with the RRC configuration/MAC CE as mentioned in step 2) of the above-described method.

Thereafter, in the CSI acquisition/reporting, the BS may receive, from the UE, the SRS and/or the UL channel(s) transmitted based on the configured/indicated SRS configuration, DCI, and/or a pre-defined (e.g., priority rule, etc.) (S1640). As an example, in multi symbol SRS transmission, in this case, the UE may be configured to transmit the SRS and/or UL channel(s) based on the rule (e.g., specifically, Proposals 2, 3, and 4) described in the above-described method.

The above-described operation of the BS may be implemented by using the devices described in FIGS. 19 to 23, and some of the entities may be omitted. For example, referring to FIG. 20, at least one processor 102/202 may control to transmit and receive channel/signal/data/information (e.g., SRS configuration, UL/DL DCI, additional SRS, PDCCH, PDSCH, PUSCH, PUCCH, PHICH, etc) by using at least one transceiver 106/206, and also control to store channel/signal/data/information to be transmitted or received in at least one memory 104/204.

The SRS transmission method of the UE to which the above-described embodiments are applied will be described in detail with reference to FIG. 17.

FIG. 17 is a flowchart for describing a method of transmitting, by a UE, a sounding reference signal in a wireless communication system according to an embodiment of the present disclosure.

Referring to FIG. 17, a method for transmitting, by a UE, a sounding reference signal in a wireless communication system according to an embodiment of the present disclosure includes a step of transmitting UE capability information related to transmission of an SRS based on a specific usage (S1710), a step of receiving SRS configuration information (S1720), and a step of transmitting the SRS (S1730).

In S1710, the UE transmits UE capability information related to transmission of a sound reference signal (SRS) based on a specific usage.

The specific usage may be based on antenna switching.

According to an embodiment, the UE capability information may be related to a plurality of panels. The UE capability information may include information on at least one of the number of antennas related to the transmission of the SRS, whether the SRS resource sets of each panel are simultaneously transmittable, or a panel switching delay.

According to an embodiment of the present disclosure, the number of antennas related to the transmission of the SRS may be based on the number of plurality of panels and the number of antennas for each panel. In this case, the number of antennas may be based on Proposal 3 above. That is, when the UE has two panels, and the capability related to the antenna switching for each panel is 1T2R, the corresponding UE may report the number of antennas related to the SRS transmission as 1T4R.

According to an embodiment, the UE capability information may include the number of plurality of panels, and the number of antennas related to the transmission of the SRS may be based on the number of antennas for each panel. That is, when the UE has two panels, and the capability related to the antenna switching for each panel is 1T2R, the corresponding UE may report {"1Tp2Rp" with "1T2R" for panel0 and "1T2R" for panel1} as follows. The embodiment may be based on Proposal 1 above.

According to an embodiment, the number of plurality of panels may include at least one of the number of transmission (Tx) panels or the number of reception (Rx) panels.

According to an embodiment, based on that the UE capability information includes information representing incapability of simultaneous transmission for the SRS resource sets of each panel, the panel switching delay may be included in the UE capability information. That is, in a UE (a UE of MPUE-assumption 1 or MPUE-assumption 3) incapable of simultaneous transmission through multi-panels, reporting the panel switching delay may be required.

According to S1710 described above, an operation of the UE (reference numeral 100/200 in FIGS. 19 to 23) which transmits, to the BS (reference numeral 100/200 in FIGS. 19 to 19), the UE capability information related to the transmission of the sounding reference signal (SRS) based on the specific usage may be implemented by the devices of FIGS. 19 to 23. For example, referring to FIG. 20, one or more processors 102 may control one or more transceivers 106 and/or one or more memories 104 so as to transmit, to the BS 200, the UE capability information related to the transmission of the sounding reference signal (SRS) based on the specific usage.

In S1720, the UE receives, from the BS, configuration information related to the transmission of the SRS.

According to an embodiment, at least one SRS resource set may be configured for each panel among the plurality of panels based on the UE capability information. The SRS resource set may include at least one SRS resource. A usage of the SRS resource may be antenna switching.

According to an embodiment, the configuration information may include information on SRS resource setting related to the plurality of panels and the SRS resource setting includes a plurality of SRS resource sets for the plurality of panels.

According to an embodiment, the configuration information may include a guard period related to the panel switching delay, and the SRS resource setting may be configured based on the guard period.

According to S1720 described above, an operation of the UE (100/200 in FIGS. 19 to 19) which receives, from the base station (100/200 in FIGS. 19 to 23), the configuration information of related to the transmission of the SRS may be implemented by the devices of FIGS. 19 to 23. For example, referring to FIG. 20, one or more processors 102 may control one or more transceivers 106 and/or one or more memories 104 so as to receive, from the BS 200, the configuration information related to the transmission of the SRS.

In S1730, the UE transmits the SRS to the BS. According to an embodiment, the SRS may be transmitted based on any one panel of the plurality of panels. The UE may be a UE based on MPUE-assumption 1 or MPUE-assumption 3 described above.

According to an embodiment, the method may further include a step of receiving downlink control information (DCI) before step S1730. In the step of receiving the downlink control information, the UE may receive, from the BS, downlink control information (DCI) for triggering the SRS. The DCI may include information representing a panel related to the transmission of the SRS.

According to an embodiment, based on that a panel related to reception of the DCI is different from the panel related to the transmission of the SRS, the SRS may be transmitted based on a predefined panel. The embodiment may be based on Proposal 4 above.

Based on that a time position at which the SRS is triggered belongs to the guard period related to the panel switching delay, the SRS may be transmitted based on a panel corresponding to a panel receiving the DCI or a panel configured by default among the plurality of panels.

Based on the time position at which the SRS is triggered deviates from the guard period related to the panel switching delay, the SRS may be transmitted based on the panel related to the transmission of the SRS. That is, the SRS may be transmitted based on a panel indicated through the DCI.

According to S1730 described above, an operation of the UE (reference numeral 100/200 in FIGS. 19 to 23) which transmits, to the BS (reference numeral 100/200 in FIGS. 19 to 23), the SRS may be implemented by the devices of FIGS. 19 to 23. For example, referring to FIG. 20, one or more processors 102 may control one or more transceivers 106 and/or one or more memories 104 so as to transmit, to the BS 200, the SRS.

The SRS reception method of the BS to which the above-described embodiments are applied will be described in detail with reference to FIG. 18.

FIG. 18 is a flowchart for describing a method for receiving, by a BS, a sounding reference signal in a wireless communication system according to another embodiment of the present disclosure.

Referring to FIG. 18, a method for receiving, by a BS, a sounding reference signal in a wireless communication system according to another embodiment of the present disclosure includes a step of receiving UE capability information related to transmission of an SRS based on a specific usage (S1810), a step of transmitting SRS configuration information (S1820), and a step of receiving the SRS (S1830).

In S1810, the BS receives, from the UE, UE capability information related to transmission of a sound reference signal (SRS) based on a specific usage. The specific usage may be based on antenna switching.

According to an embodiment, the UE capability information may be related to a plurality of panels. The UE capability information may include information on at least one of the number of antennas related to the transmission of the SRS, whether the SRS resource sets of each panel are simultaneously transmittable, or a panel switching delay.

According to an embodiment of the present disclosure, the number of antennas related to the transmission of the SRS may be based on the number of plurality of panels and the number of antennas for each panel. In this case, the number of antennas may be based on Proposal 3 above. That is, when the UE has two panels, and the capability related to the antenna switching for each panel is 1T2R, the corresponding UE may report the number of antennas related to the SRS transmission as 1T4R.

According to an embodiment, the UE capability information may include the number of plurality of panels, and the number of antennas related to the transmission of the SRS may be based on the number of antennas for each panel. That is, when the UE has two panels, and the capability related to the antenna switching for each panel is 1T2R, the corresponding UE may report {"1Tp2Rp" with "1T2R" for panel0 and "1T2R" for panel1} as follows. The embodiment may be based on Proposal 1 above.

According to an embodiment, the number of plurality of panels may include at least one of the number of transmission (Tx) panels or the number of reception (Rx) panels.

According to an embodiment, based on that the UE capability information includes information representing incapability of simultaneous transmission for the SRS resource sets of each panel, the panel switching delay may be included in the UE capability information. That is, in a UE (a UE of MPUE-assumption 1 or MPUE-assumption 3) incapable of simultaneous transmission through multi-panels, reporting the panel switching delay may be required.

According to S1810 described above, an operation of the BS (reference numeral 100/200 in FIGS. 19 to 23) which receives, from the UE (reference numeral 100/200 in FIGS. 19 to 23), the UE capability information related to the transmission of the sounding reference signal (SRS) based on the specific usage may be implemented by the devices of FIGS. 19 to 23. For example, referring to FIG. 20, one or more processors 202 may control one or more transceivers 206 and/or one or more memories 204 so as to receive, to the UE 100, the UE capability information related to the transmission of the sounding reference signal (SRS) based on the specific usage.

In S1820, the BS transmits, to the UE, configuration information related to the transmission of the SRS.

According to an embodiment, at least one SRS resource set may be configured for each panel among the plurality of panels based on the UE capability information. The SRS resource set may include at least one SRS resource. A usage of the SRS resource may be antenna switching.

According to an embodiment, the configuration information may include information on SRS resource setting related to the plurality of panels and the SRS resource setting includes a plurality of SRS resource sets for the plurality of panels.

According to an embodiment, the configuration information may include a guard period related to the panel switching delay, and the SRS resource setting may be configured based on the guard period.

According to S1820 described above, an operation of the BS (reference numeral 100/200 in FIGS. 19 to 23) which transmits, to the UE (reference numeral 100/200 in FIGS. 19 to 23), the configuration information of related to the transmission of the SRS may be implemented by the devices of FIGS. 19 to 23. For example, referring to FIG. 20, one or more processors 202 may control one or more transceivers 206 and/or one or more memories 204 so as to transmit, to the UE 100, the configuration information related to the transmission of the SRS.

In S1830, the BS receives the SRS from the UE. According to an embodiment, the SRS may be transmitted based on any one panel of the plurality of panels. The UE may be a UE based on MPUE-assumption 1 or MPUE-assumption 3 described above.

According to an embodiment, the method may further include a step of transmitting downlink control information (DCI) before step S1830. In the step of transmitting the downlink control information, the BS may transmit, to the UE, downlink control information (DCI) for triggering the SRS. The DCI may include information representing a panel related to the transmission of the SRS.

According to an embodiment, based on that a panel related to reception of the DCI is different from the panel related to the transmission of the SRS, the SRS may be transmitted based on a predefined panel. The embodiment may be based on Proposal 4 above.

Based on that a time position at which the SRS is triggered belongs to the guard period related to the panel switching delay, the SRS may be transmitted based on a panel corresponding to a panel receiving the DCI or a panel configured by default among the plurality of panels.

Based on the time position at which the SRS is triggered deviates from the guard period related to the panel switching delay, the SRS may be transmitted based on the panel related to the transmission of the SRS. That is, the SRS may be transmitted based on a panel indicated through the DCI.

According to S1830 described above, an operation of the BS (reference numeral 100/200 in FIGS. 19 to 23) which receives, from the UE (reference numeral 100/200 in FIGS. 19 to 23), the SRS may be implemented by the devices of FIGS. 19 to 23. For example, referring to FIG. 20, one or more processors 202 may control one or more transceivers 206 and/or one or more memories 204 so as to receive, from the UE 100, the SRS.

Communication System Applied to the Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 19 illustrates a communication system applied to the present disclosure.

Referring to FIG. 19, a communication system (1) applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV)

(e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. Relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Devices Applicable to the Present Disclosure

FIG. 20 illustrates wireless devices applicable to the present disclosure.

Referring to FIG. 20, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 19.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include at least one processor 202 and at least one memory 204 and additionally further include at least one transceiver 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 206 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. From RF band signals into baseband signals in order to process received user data, control information, radio signals/channels, etc. Using the one or more processors 102 and 202. The one or more transceivers 106 and 206 may convert the user data, control information, radio signals/channels, etc. Processed using the one or more processors 102 and 202 from the base band signals into the RF band signals. To this end, the one or more transceivers 106 and 206 may include (analog) oscillators and/or filters.

Signal Processing Circuit Example to which Present Invention is Applied

FIG. 21 illustrates a signal processing circuit for a transmit signal.

Referring to FIG. 21, a signal processing circuit 1000 may include a scrambler 1010, a modulator 1020, a layer mapper 1030, a precoder 1040, a resource mapper 1050, and a signal generator 1060. Although not limited thereto, an operation/function of FIG. 21 may be performed by the processors 102 and 202 and/or the transceivers 106 and 206 of FIG. 20. Hardware elements of FIG. 21 may be implemented in the processors 102 and 202 and/or the transceivers 106 and 206 of FIG. 20. For example, blocks 1010 to 1060 may be implemented in the processors 102 and 202 of FIG. 20. Further, blocks 1010 to 1050 may be implemented in the processors 102 and 202 of FIG. 20 and the block 1060 of FIG. 20 and the block 1060 may be implemented in the transceivers 106 and 206 of FIG. 20.

A codeword may be transformed into a radio signal via the signal processing circuit 1000 of FIG. 21. Here, the codeword is an encoded bit sequence of an information block. The information block may include transport blocks (e.g., a UL-SCH transport block and a DL-SCH transport block). The radio signal may be transmitted through various physical channels (e.g., PUSCH and PDSCH).

Specifically, the codeword may be transformed into a bit sequence scrambled by the scrambler 1010. A scramble sequence used for scrambling may be generated based on an initialization value and the initialization value may include ID information of a wireless device. The scrambled bit sequence may be modulated into a modulated symbol sequence by the modulator 1020. A modulation scheme may include pi/2-BPSK(pi/2-Binary Phase Shift Keying), m-PSK(m-Phase Shift Keying), m-QAM(m-Quadrature Amplitude Modulation), etc. A complex modulated symbol sequence may be mapped to one or more transport layers by the layer mapper 1030. Modulated symbols of each transport layer may be mapped to a corresponding antenna port(s) by the precoder 1040 (precoding). Output z of the precoder 1040 may be obtained by multiplying output y of the layer mapper 1030 by precoding matrix W of N*M. Here, N represents the number of antenna ports and M represents the number of transport layers. Here, the precoder 1040 may perform precoding after performing transform precoding (e.g., DFT transform) for complex modulated symbols. Further, the precoder 1040 may perform the precoding without performing the transform precoding.

The resource mapper 1050 may map the modulated symbols of each antenna port to a time-frequency resource. The time-frequency resource may include a plurality of symbols (e.g., CP-OFDMA symbol and DFT-s-OFDMA symbol) in a time domain and include a plurality of subcarriers in a frequency domain. The signal generator 1060 may generate the radio signal from the mapped modulated symbols and the generated radio signal may be transmitted to another device through each antenna. To this end, the signal generator 1060 may include an Inverse Fast Fourier Transform (IFFT) module, a Cyclic Prefix (CP) inserter, a Digital-to-Analog Converter (DAC), a frequency uplink converter, and the like.

A signal processing process for a receive signal in the wireless device may be configured in the reverse of the signal processing process (1010 to 1060) of FIG. 21. For example, the wireless device (e.g., 100 or 200 of FIG. 20) may receive the radio signal from the outside through the antenna port/transceiver. The received radio signal may be transformed into a baseband signal through a signal reconstructer. To this end, the signal reconstructer may include a frequency downlink converter, an analog-to-digital converter (ADC), a CP remover, and a Fast Fourier Transform (FFT) module. Thereafter, the baseband signal may be reconstructed into the codeword through a resource demapper process, a postcoding process, a demodulation process, and a de-scrambling process. The codeword may be reconstructed into an original information block via decoding. Accordingly, a signal processing circuit (not illustrated) for the receive signal may include a signal reconstructer, a resource demapper, a postcoder, a demodulator, a descrambler, and a decoder.

Example of a Wireless Device Applied to the Present Disclosure

FIG. 22 illustrates another example of a wireless device applied to the present disclosure. The wireless device may be implemented in various forms according to a use-case/service (refer to FIG. 19).

Referring to FIG. 22, wireless devices 100 and 200 may correspond to the wireless devices 100 and 200 of FIG. 20 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 104 of FIG. 20. For example, the transceiver(s) 114 may include the one or more transceivers 106 and 106 and/or the one or more antennas 108 and 108 of FIG. 20. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110).

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 19), the vehicles (100b-1 and 100b-2 of FIG. 19), the XR device (100c of FIG. 19), the hand-held device (100d of FIG. 19), the home appliance (100e of FIG. 19), the IoT device (100f of FIG. 19), a digital broadcast terminal, a hologram device, a public safety device, an MTC device, a medicine device, a fintech device (or a finance device), a security device, a climate/environment device, the AI server/device (400 of FIG. 19), the BSs (200 of FIG. 19), a network node, etc. The wireless device may be used in a mobile or fixed place according to a use-example/service.

In FIG. 22, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Portable Device Example to which Present Invention is Applied

FIG. 23 illustrates a portable device applied to the present disclosure.

The portable device may include a smart phone, a smart pad, a wearable device (e.g., a smart watch, a smart glass), and a portable computer (e.g., a notebook, etc.). The portable device may be referred to as a Mobile Station (MS), a user terminal (UT), a Mobile Subscriber Station (MSS), a Subscriber Station (SS), an Advanced Mobile Station (AMS), or a Wireless terminal (WT).

Referring to FIG. 23, a portable device 100 may include an antenna unit 108, a communication unit 110, a control unit 120, a memory unit 130, a power supply unit 140a, an interface unit 140b, and an input/output unit 140c. The antenna unit 108 may be configured as a part of the communication unit 110. The blocks 110 to 130/140a to 140c correspond to the blocks 110 to 130/140 of FIG. 22, respectively.

The communication unit 110 may transmit/receive a signal (e.g., data, a control signal, etc.) to/from another wireless device and eNBs. The control unit 120 may perform various operations by controlling components of the portable device 100. The control unit 120 may include an Application Processor (AP). The memory unit 130 may store data/parameters/programs/codes/instructions required for driving the portable device 100. Further, the memory unit 130 may store input/output data/information, etc. The power supply unit 140a may supply power to the portable device 100 and include a wired/wireless charging circuit, a battery, and the like. The interface unit 140b may support a connection between the portable device 100 and another external device. The interface unit 140b may include various ports (e.g., an audio input/output port, a video input/output port) for the connection with the external device. The input/output unit 140c may receive or output a video information/signal, an audio information/signal, data, and/or information input from a user. The input/output unit 140c may include a camera, a microphone, a user input unit, a display unit 140d, a speaker, and/or a haptic module.

As one example, in the case of data communication, the input/output unit 140c may acquire information/signal (e.g., touch, text, voice, image, and video) input from the user and the acquired information/signal may be stored in the memory unit 130. The communication unit 110 may transform the information/signal stored in the memory into the radio signal and directly transmit the radio signal to another wireless device or transmit the radio signal to the eNB. Further, the communication unit 110 may receive the radio signal from another wireless device or eNB and then reconstruct the received radio signal into original information/signal. The reconstructed information/signal may be stored in the memory unit 130 and then output in various forms (e.g., text, voice, image, video, haptic) through the input/output unit 140c.

Effects of the method for transmitting and receiving the SRS in the wireless communication system and the device therefor according to the embodiment of the present disclosure are described below.

According to an embodiment of the present disclosure, an SRS for an antenna switching usage, which is transmitted by a multi-panel UE is transmitted based on an SRS resource set configured for each panel. Accordingly, downlink channel state information can be obtained for each panel.

According to an embodiment of the present disclosure, UE capability information transmitted by a UE incapable of simultaneous transmission through multi-panels includes a panel switching delay. The configuration information related to the transmission of the SRS includes information on SRS resource setting including a plurality of resource sets for a plurality of panels. The SRS resource setting can be configured based on a guard period related to the panel switching delay. Accordingly, since the UE transmits the SRS within a range of a capability related to panel switching, reliability of SRS transmission for antenna switching can be secured.

According to an embodiment of the present disclosure, when a panel receiving downlink control information (DCI) for triggering the SRS and a panel indicated through the DCI are different, the SRS transmission is performed based on a predefined panel. The predefined panel varies depending on whether a time position at which the SRS is triggered belongs to the guard period related to the panel switching delay. Accordingly, the panel for the SRS transmission is clearly distinguished based on a UE capability (penal switching delay), so the ambiguity of a UE operation can be removed.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and may implement embodiments of the present disclosure. The order of operations described in embodiments of the present disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure may be implemented by various means, for example, hardware, firmware, software, or combinations thereof. When embodiments are implemented by hardware, one embodiment of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure may be implemented by modules, procedures, functions, etc. Performing functions or operations described above. Software code may be stored in a memory and may be driven by a processor. The memory is provided inside or outside the processor and may exchange data with the processor by various well-known means.

It is apparent to those skilled in the art that the present disclosure may be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

The invention claimed is:

1. A method for transmitting, by a user equipment (UE), a sounding reference signal (SRS) in a wireless communication system, the method comprising:
   transmitting UE capability information related to transmission of a sound reference signal (SRS) based on a specific usage;
   receiving downlink control information (DCI) for triggering the SRS, wherein the DCI includes information representing a panel related to the transmission of the SRS;
   receiving configuration information related to transmission of the SRS; and
   transmitting the SRS,
   wherein the UE capability information is related to a plurality of panels, wherein at least one SRS resource set is configured for each panel among the plurality of panels based on the UE capability information, and wherein the SRS is transmitted based on any one panel of the plurality of panels, wherein based on that a panel related to reception of the DCI is different from the panel related to the transmission of the SRS, the SRS is transmitted based on a predefined panel, and wherein based on that a time position at which the SRS is triggered belongs to a guard period related to a panel switching delay, the predefined panel is determined be to the panel receiving the DCI or a panel configured as default among the plurality of panels.

2. The method of claim 1, wherein the specific usage is based on antenna switching, and the SRS resource set includes at least one SRS resource.

3. The method of claim 2, wherein the UE capability information includes information on at least one of a number of antennas related to the transmission of the SRS, whether the SRS resource sets of each panel are simultaneously transmittable, or the panel switching delay.

4. The method of claim 3, wherein the number of antennas related to the transmission of the SRS is based on a number of plurality of panels and a number of antennas for each panel.

5. The method of claim 3, wherein the UE capability information includes the number of plurality of panels, and the number of antennas related to the transmission of the SRS is based on the number of antennas for each panel.

6. The method of claim 5, wherein the number of plurality of panels includes at least one of a number of transmission (Tx) panels or a number of reception (Rx) panels.

7. The method of claim 3, wherein based on that the UE capability information includes information representing incapability of simultaneous transmission for the SRS resource sets of each panel,
the panel switching delay is included in the UE capability information.

8. The method of claim 7, wherein the configuration information includes information on SRS resource setting related to the plurality of panels and the SRS resource setting includes a plurality of SRS resource sets for the plurality of panels.

9. The method of claim 8, wherein the configuration information includes the guard period related to the panel switching delay, and
wherein the SRS resource setting is configured based on the guard period.

10. The method of claim 3, wherein based on the time position at which the SRS is triggered deviates from the guard period related to the panel switching delay, the predefined panel is determined to be the panel related to the transmission of the SRS.

11. A UE for transmitting a sounding reference signal (SRS) in a wireless communication system, the UE comprising:
one or more transceivers;
one or more processors; and
one or more memories operably connectable to the one or more processors, and storing instructions of performing operations when the transmission of the SRS is executed by the one or more processors,
wherein the operations include:
transmitting UE capability information associated with transmission of a sound reference signal (SRS) based on a specific usage;
receiving downlink control information (DCI) for triggering the SRS, wherein the DCI includes information representing a panel related to the transmission of the SRS;
receiving configuration information related to transmission of the SRS; and
transmitting the SRS,
wherein the UE capability information is related to a plurality of panels,
wherein at least one SRS resource set is configured for each panel among the plurality of panels based on the UE capability information, and
wherein the SRS is transmitted based on any one panel of the plurality of panels,
wherein based on that a panel related to reception of the DCI is different from the panel related to the transmission of the SRS, the SRS is transmitted based on a predefined panel, and
wherein based on that a time position at which the SRS is triggered belongs to a guard period related to a panel switching delay, the predefined panel is determined to be the panel receiving the DCI or a panel configured as default among the plurality of panels.

12. A method for receiving, by a base station (BS), a sounding reference signal (SRS) in a wireless communication system, the method comprising:
receiving UE capability information associated with transmission of a sound reference signal (SRS) based on a specific usage;
transmitting downlink control information (DCI) for triggering the SRS, wherein the DCI includes information representing a panel related to the transmission of the SRS;
transmitting configuration information related to transmission of the SRS; and
receiving the SRS,
wherein the UE capability information is related to a plurality of panels,
wherein at least one SRS resource set is configured for each panel among the plurality of panels based on the UE capability information, and
wherein the SRS is transmitted based on any one panel of the plurality of panels,
wherein based on that a panel related to reception of the DCI is different from the panel related to the transmission of the SRS, the SRS is transmitted based on a predefined panel, and
wherein based on that a time position at which the SRS is triggered belongs to a guard period related to a panel switching delay, the predefined panel is determined to be the panel receiving the DCI or a panel configured as default among the plurality of panels.

* * * * *